(12) United States Patent
Takada et al.

(10) Patent No.: US 8,111,602 B2
(45) Date of Patent: Feb. 7, 2012

(54) OBJECTIVE LENS, OPTICAL PICKUP DEVICE, AND OPTICAL DISK DRIVE

(75) Inventors: Kyu Takada, Otsu (JP); Kiyono Tateyama, Hino (JP); Kentarou Nakamura, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/999,856

(22) PCT Filed: Jun. 1, 2009

(86) PCT No.: PCT/JP2009/059961
§ 371 (c)(1),
(2), (4) Date: Dec. 17, 2010

(87) PCT Pub. No.: WO2009/154072
PCT Pub. Date: Dec. 23, 2009

(65) Prior Publication Data
US 2011/0085433 A1    Apr. 14, 2011

(30) Foreign Application Priority Data

Jun. 20, 2008  (JP) .................................. 2008-161972
Aug. 19, 2008  (JP) .................................. 2008-210517

(51) Int. Cl.
*G11B 7/00*  (2006.01)
(52) U.S. Cl. .......... 369/112.08; 369/112.05; 369/112.25
(58) Field of Classification Search ............. 369/112.08, 369/112.05, 112.25
See application file for complete search history.

(56) References Cited

U.S. PATENT DOCUMENTS 7,327,663 B2 * 2/2008 Kimura et al. ............ 369/112.08
7,636,291 B2 * 12/2009 Ikenaka ..................... 369/112.08
7,672,211 B2   3/2010 Nakamura et al.
7,672,212 B2 * 3/2010 Nakamura et al. ........ 369/112.12
2007/0211600 A1 * 9/2007 Ikenaka ..................... 369/112.08
2007/0211601 A1 * 9/2007 Ikenaka ..................... 369/112.08
2007/0211602 A1 * 9/2007 Ikenaka ..................... 369/112.08
2007/0211603 A1 * 9/2007 Ikenaka ..................... 369/112.08
2007/0211608 A1 * 9/2007 Nakamura et al. ........ 369/112.25

FOREIGN PATENT DOCUMENTS

| JP | 2004-247025 | 9/2004 |
|---|---|---|
| JP | 2005-129227 | 5/2005 |
| JP | 2005-158217 | 6/2005 |
| JP | 2005 306627 | 11/2005 |
| JP | 2007-128654 | 5/2007 |
| JP | 2008-90994 | 4/2008 |
| WO | WO 2007/102315 | 9/2007 |
| WO | WO 2007/145202 | 12/2007 |
| WO | WO 2008/007553 | 1/2008 |

* cited by examiner

*Primary Examiner* — Joseph Feild
*Assistant Examiner* — Parul Gupta
(74) *Attorney, Agent, or Firm* — Cozen O'Connor

(57) ABSTRACT

Provided are an optical pickup apparatus and an objective lens which can record and/or reproduce information for discs with different recording densities and can realize simplification of the structure of themselves and reducing cost. When the expression (1) is satisfied, step differences of a step structure can be further reduced than those in the case that $d1=\lambda 1/(n-1)$ holds, and fine grooves corresponding to a steps structure, formed on an optical-surface transfer surface of a mold for molding the objective lens become shallow, to be easily processed. In addition, the moldability is enhanced because the material of the objective lens easily enters the inner portion of the grooves. Further, a fluctuation of a diffraction efficiency caused when wavelength of a light flux changes or temperature changes is reduced so that information can be recorded and/or reduced stably.

25 Claims, 11 Drawing Sheets

OPTICAL PATH DIFFERENCE FOR ONE STEP [λ]

OBJECTIVE LENS, OPTICAL PICKUP DEVICE, AND OPTICAL DISK DRIVE

RELATED APPLICATIONS

This application is a U.S. National Phase Application under 35 USC 371 of International Application PCT/JP2009/059961 filed Jun. 1, 2009.

This application claims the priority of Japanese application 2008-161972 filed Jun. 20, 2008 and 2008-210517, the entire content of both of which are hereby incorporated by reference.

TECHNICAL FIELD

The present invention relates to an optical pickup apparatus and an optical disc drive apparatus which can record and/or reproduce information compatibly for various types of optical discs, and to an objective lens for use in the same.

BACKGROUND ART

In recent years, in an optical pickup apparatus, a wavelength of a laser light source which is employed as a light source for reproducing information recorded on an optical disc and for recording information on an optical disc, is becoming shorter. For example, a laser light source with wavelength $\lambda 1=0.39$ to $0.42$ μm, such as a blue-violet semiconductor laser and a blue-SHG laser in which wavelength of an infrared semiconductor laser is converted by utilizing a second harmonic wave, is reaching the stage of practical application. A use of these blue-violet laser light sources enables to record information of 15 to 20 GB on an optical disc with a diameter of 12 cm, when an objective lens with the numerical aperture (NA) which is the same as a DVD (Digital Versatile Disc) is used. When the NA is increased up to 0.85, information of 23 to 25 GB can be recorded onto an optical disc with a diameter of 12 cm. In this specification, an optical disc and an optical-magnetic disc which employ a blue-violet laser light source are referred as "high density optical discs" as their general name.

Hereupon, as for a high density optical disc using an objective lens with NA of 0.85, coma caused due to an inclination (skew) of the optical disc becomes larger. Therefore, some of the high density optical discs are designed so that its protective layer becomes thinner (which is 0.1 mm, while that of a DVD is 0.6 mm) than that of a DVD, to reduce the amount of coma due to the skew. On the other hand, it is hard to say that a value of an optical disc player/recorder (optical information recording and reproducing apparatus) as a product is not enough under just a condition that it can record and/or reproduce information for the above high density optical discs properly. Taking account of a fact that, at present, DVDs and CDs (Compact Discs) onto which various kinds of information have been recorded, are on the market, it is not enough that information can be recorded/reproduced only for the above high density optical disc properly. For example, realization of recording and/or reproducing information appropriately also for DVDs and CDs which are owned by users, leads to enhancement of its commercial value as an optical disc player/recorder for high density optical discs. From these backgrounds, an optical pickup apparatus installed in an optical disc player/recorder for high density optical discs is required to have a property to be capable of appropriately recording and/or reproducing information not only for the high density optical discs but also for DVDs and CDs, with maintaining compatibility.

As a method which is capable of recording and/or reproducing information adequately to anyone of high density optical discs and DVDs and further to CDs with maintaining compatibility, there can be considered a method to selectively switch an optical system for high density optical discs and an optical system for DVDs and CDs, corresponding to the recording density of an optical disc on which information will be recorded and/or reproduced. However, it is disadvantageous for the size-reduction and increases the cost, because it requires a plurality of optical systems.

Accordingly, in order to simplify the structure of an optical pickup apparatus and to intend the reduction of cost, it is preferable to make an optical system for high density optical discs and an optical system for DVDs and CDs into a common optical system, and to reduce the number of optical parts constructing the optical pickup apparatus as much as possible, even in the optical pickup apparatus with compatibility. Then, providing the common objective lens which is arranged with facing an optical disc, is most advantageous for the simplification of the construction and cost reduction of the optical pickup apparatus. Here, in order to obtain an objective lens which can be commonly used for plural kinds of optical discs for which different recording/reproducing wavelengths are used, it is required that an optical path difference providing structure having a wavelength dependency in spherical aberration, is formed on the objective optical system, to reduce spherical aberrations caused by a difference in wavelength and a difference in thickness of protective layers.

Patent Literature 1 discloses and optical element for use in an objective lens that includes two optical path difference providing structures and that is usable compatibly for high density optical discs and conventional DVDs and CDs.

Further, Patent Literature 2 discloses an optical element realizing compatibility by using a hologram which has a stair-shaped sectional form and includes step differences in its inner peripheral section for providing an optical path difference of about 1.25 times the wavelength for a light flux with 390 to 415 nm, and discloses an optical element which realizing compatibility by using a hologram which has a stair-shaped sectional form and includes step differences in its outer peripheral section for providing an optical path difference of about 0.25 times the wavelength for a light flux with 390 to 415

Patent Literature 3 discloses an objective lens that includes an optical path difference providing structure in which two basic structures are overlapped together, and that is usable compatibly for high density optical discs and conventional DVDs and CDs.

CITATION LIST

Patent Literature

Patent Literature 1: Unexamined Japanese Patent Application Publication No. 2005-158217
Patent Literature 2: U.S. Pat. No. 3,993,870
Patent Literature 3: U.S. Pat. No. 4,033,240

SUMMARY OF INVENTION

Technical Problem

Nevertheless, according to the technology disclosed in Patent Literature 1, an objective lens is composed of a refractive lens and a tabular optical element. An optical path difference providing structure formed on the tabular optical element has a step structure in which an optical path difference provided by a height of one step is about (2×λ1) in order to realize compatibility between a high density optical disc and a DVD, where λ1 represents a wavelength of a laser light source used for reproducing or recording information for a high density optical disc, while, another optical path difference providing structure has a step structure in which an optical path difference provided by a height of one step is about (5×λ1) in order to realize compatibility between a high density optical disc and a CD. In this case, a step structure in which an optical path difference provided by a height of one step is about (5×λ1) is the so-called two-level structure that has a problem that the diffraction efficiency in the case of using CD is lowered to about 42%. Further, if an optical path difference provided by a height of one step is about (5×λ1), a step difference in an actual dimension becomes as relatively high as 3.7 μm, which causes problems that processing of an optical-surface transfer surface of a mold with which objective lenses are molded is difficult and molding objective lenses is difficult. In particular, when an optical path difference providing structure is formed, not on a tabular element but on an optical surface of a single lens, the problem of molding processing becomes to be more remarkable. The problems of molding lead to a decline of light utilization efficiency. Namely, when molding is difficult, transferability of an objective lens is deteriorated, resulting in an increase of manufacturing errors in terms of a form, which leads to a problem of a large loss of amount of light. In particular, when a laser light source with a short wavelength of 039-0.42 μm was used, it was difficult to acquire a large amount of light, and a problem of a loss of amount of light was remarkable.

According to the technology disclosed in Patent Literature 1, there was also a problem that the fluctuations of diffraction efficiencies corresponding to perturbations such as a wavelength fluctuation of a light source and temperature fluctuations grew greater, because a step difference is high. In particular, the problem of diffraction efficiencies was remarkable when a laser light source with a short wavelength of 0.39-0.42 μm was used.

Further, Patent Literature 1 discloses an example wherein a material with Abbe number of 23-30 is used for the objective lens, and all the diffraction efficiencies for a high density optical disc, DVD and CD are 50% or more. However, materials with small Abbe number of 23-30 exhibit great dispersion, namely, a great change of refractive index corresponding to a wavelength change. Therefore, aberrations generated by the wavelength change grows to be too great, which is a problem.

Further, the example wherein a material with Abbe number of 23-30 is used has a problem that processing of an optical-surface transfer surface of a mold with which objective lenses are molded becomes more difficult and molding of objective lenses becomes difficult, because, in an optical path difference providing structure for realizing compatibility between a high density optical disc and CD, a height of one step is so high that an optical difference provided by the height of one step is 7×λ1 or more.

According to the technology disclosed by Patent Literature 2, there are problems that processing of an optical transfer surface of a mold with which objective lenses are molded is difficult and molding of objective lenses is difficult, because a height of one step is as high as 1.25λ1, in an area on an inner peripheral section that is used commonly for two optical discs. In addition, there was also a problem that fluctuations of diffraction efficiencies corresponding to perturbations such as wavelength fluctuations of a light source and temperature fluctuations grow greater, because a height of a step difference is high.

On the other hand, according to the technology disclosed by Patent Literature 2, a structure in which a height of one step is as low as 0.25λ1 is used in an outer peripheral section. When a height of one step is 0.25λ1, a diffraction order number of diffracted light with wavelength λ1 and a diffraction order number of diffracted light with wavelength λ3 become to be in relationship to have the same sign. Therefore, it is hard to provide a large difference in diffraction angle between a diffracted light with wavelength λ1 and diffracted light with wavelength λ3, thus, it becomes difficult to secure a pitch width (a length in the direction perpendicular to the optical axis) of a step structure of the first basic structure to be wide. Therefore, even if the height of the step difference is lowered, the width of the pitch becomes thin, which makes an objective lens difficult to be manufactured, as a result. Further, Patent Literature 2 does not suggest about using a structure where a height of a step difference is low for an area that is used commonly for plural optical discs.

Further, according to the technology disclosed in Patent Literature 3, the objective lens has a step structure in which an optical path difference provided by a height of one step is about (5×λ1) in order to realize compatibility use between a high density optical discs and CD. The step structure in which an optical path difference provided by a height of one step is about (5×λ1) in this case is the so-called two-level structure that has a problem that the diffraction efficiency in the case of using CD is lowered to about 42%. Further, if an optical difference provided by a height of one step is about (5×λ1), a step difference in actual dimension becomes to be relatively high to 3.7 μm, resulting in problems that processing of an optical-surface transfer surface of a mold with which objective lenses are molded is difficult and molding objective lenses is difficult. The problems of molding lead to a decline of light utilization efficiency. Namely, when molding is difficult, transferability of objective lens is deteriorated, resulting in an increase of manufacturing errors in terms of a form, which leads to a problem of a large loss of amount of light.

Further, according to the technology disclosed in Patent Literature 3, there had been a problem that fluctuations of diffraction efficiencies corresponding to perturbations such as wavelength fluctuations of a light source and temperature fluctuations grow greater, because the height of a step difference is high.

The present invention represents those accomplished in view of the aforesaid problems, and it includes an optical pickup apparatus and an objective lens which can record and/or reproduce information properly for optical discs with different recording densities, such as high density optical discs (BDs in particular), CDs and further DVDs, and aims to provide an objective lens which can exhibit desired optical properties, prevents a structure of mold from being too complicated from views of both of height of a step difference and width of pitch, provides excellent transferability, keeps high light utilization efficiency, controls fluctuations of diffraction efficiencies caused under a wavelength fluctuation and a temperature fluctuation to be small, and further can realize simplification of its structure and cost reduction, and to provide an optical pickup apparatus employing the same.

Further, the invention further aims to provide an objective lens which is easily manufactured in the case of using a material with Abbe number of 50 or more which generates less aberrations under a wavelength change, and to provide an optical pickup apparatus employing the same.

Solution to Problem

To solve the aforesaid problems, an objective lens described in Item 1 is an objective lens for use in an optical pickup apparatus, for forming a converged spot on an information recording surface of a first optical disc including a protective layer with a thickness t1 by using a first light flux with a wavelength λ1 (μm) emitted from a first light source, and for forming a converged spot on an information recording surface of a third optical disc including a protective layer with a thickness t3 (t1<t3) by using a third light flux with a wavelength λ3 (1.7 λ1<λ3<2.3λ1) emitted from a third light source. The objective lens is characterized in that an optical surface of the objective lens comprises a first basic structure being an optical path difference providing structure, the first basic structure comprises a step structure in which a plurality of ring-shaped step units are arranged concentrically about an optical axis as a center, and a step-difference amount d1 of a small step difference in each of the step units, in a direction of the optical axis satisfies the following conditional expression, where n is a refractive index of the objective lens for the first light flux.

$$0.5\lambda1/(n-1) < d1 < \lambda1/(n-1) \quad (1)$$

In conventional optical pickup apparatuses, a diffraction efficiency of a light flux with wavelength λ1 used for a high density optical disc is given priority in many cases, and step structures employing step-difference amounts in the optical axis direction d1=2λ1/(n−1) (Patent Literature 1), d1=1.25λ1/(n−1) (Patent Literature 2) and d1=5λ1/(n−1) (Patent Literatures 1 and 3) have been used, as described in the aforesaid Patent Literatures 1, 2, and 3. According to those conventional technologies, a step-difference amount in the optical axis direction tends to be greater. Therefore, microscopic grooves corresponding to a step structure to be formed on an optical-surface transfer surface of a mold that molds objective lenses, needs to be deep. It causes problems that its processing is difficult and a material hardly enter the inner part of the grooves when a objective lens is moded.

In this case, the present inventors have changed a point of view for conventional common sense and carried out review from a free way of thinking. More concretely, it has been considered that diffraction efficiency for a light flux with wavelength λ3 was also enhanced to be well-balanced, without giving top priority to the diffraction efficiency of the light flux with wavelength λ1. In this case, a limitation to make the step-difference amount in the optical axis direction d1 in the step structure to be Nλ1(n−1) (N represents an integer) is removed, and a degree of freedom is enhanced.

However, easiness of manufacturing objective lenses is not improved greatly just by setting the step-difference amount in the optical axis direction d1 to an arbitral value. In this case, the wavelength λ1 of a light flux that is used for a high density optical disc is about a half of the wavelength λ3 of a light flux used for CD. Therefore, when two light fluxes enter the same diffraction structure, an optical path difference provided to the light flux with wavelength λ1 is about twice that provided to the light flux with wavelength λ1. Therefore, the present inventors have stipulated the most suitable step-difference amount d1 in the optical axis direction of a small step difference of the aforesaid step unit, by utilizing the relationship between the wavelength λ1 and the wavelength λ1. By changing the step-difference amount in the optical axis direction d1 of a small step difference of the step unit, it is possible to change an optical path difference of diffracted light emitted from the first basic structure.

Incidentally, when there is a step difference on an optical element, an optical path difference is generated on the step difference. The optical path difference changes when a wavelength changes. For example, when optical path difference H1 is generated for a light flux with wavelength λ1, on a certain step difference, an optical path difference H3 (H3<H1: where each of H1 and H3 is a real number including an integer portion and a decimal portion) is generated for a light flux with wavelength λ3 (λ1<λ3), on the same step difference. As for these arbitral optional optical path differences H1 and H3, under the situation that decimal portions of optical path differences H1 and H3 are greater than 0.5, or they are smaller than 0.5, a positive or negative sign of a diffraction order number of a diffracted light flux with the maximum diffracted-light amount among diffracted light fluxes generated when the light flux with wavelength λ1 enters the first basic structure is the same as a positive or negative sign of a diffraction order number of a diffracted light flux with the maximum diffracted-light amount among diffracted light fluxes generated when the light flux with wavelength λ3 enters the first basic structure. This is called "the diffraction order numbers having the same sign". On the other hand, under the condition that, among the arbitral optical path differences H1 and H3, the decimal portion is greater than 0.5 for one side and the decimal portion is smaller than 0.5 or less for the other side, a positive or negative sign of diffraction order number of the diffracted light flux with the maximum diffracted-light amount among diffracted light fluxes generated when the light flux with wavelength λ1 enters the fast basic structure is different from a positive or negative sign of diffraction order number of a diffracted light flux with the maximum diffracted light amount among diffracted light fluxes generated when the light flux with wavelength λ3 enters the first basic structure. This is called "the diffraction order numbers having the different signs".

For example, it is considered that the condition that d1 is defined to be 0.25λ1/(n−1) or d1 is defined to be 0.3λ1/(n−1) so that an step-difference amount of a small step difference of the step structure may be extremely small, like a structure of an outer peripheral section in Patent Literature 2, because processability is emphasized excessively. Under the condition, optical path difference H1 becomes 0.25 or 0.3, and optical path difference H3 becomes 0.125 or 0.15. The decimal portions of optical path difference H1 and optical path difference H3 become to be smaller than 0.5, which do not achieve the relationship that the decimal portion of the optical path difference 111 is greater than 0.5 and the decimal portion of the optical path difference H3 is smaller than 0.5, but achieves the relationship that the diffraction order number of diffracted light with wavelength λ1 and the diffraction order number of diffracted light with wavelength λ3 has the same sign. Therefore, it is hard to provide a large diffraction-angle difference between the diffracted light with wavelength λ1 and the diffracted light with wavelength λ3, and it becomes difficult to secure the width (a length in the direction perpendicular to the optical axis) of pitch of the first basic structure in the step structure to be wide. As a result, the objective lenses become those which are difficult to be manufactured, even when height of the step difference is lowered.

In this case, if step-difference amount d1 is changed to satisfy the expression (1) and optical path difference H1 (λ1) that is larger than 0.51λ1 and is smaller than 1.0λ1 is provided by a small step difference of the step unit in the first basic structure when a light flux with wavelength λ1 enters it, optical path difference H3 (λ3) that is larger than 0.25 and is smaller than 0.5 is provided by the small step difference of the step unit in the first basic structure when a light flux with wavelength λ3 enters it.

Accordingly, when the expression (1) is satisfied, a relationship that a decimal portion of optical path difference H1 is larger than 0.5 and a decimal portion of optical path difference H3 is smaller than 0.5 comes into existence between optical path difference H1 and optical difference H3, and a diffraction order number of diffracted light with wavelength λ1 and a diffraction order number of diffracted light with wavelength λ3 become to be in a relationship of different signs. Therefore, compared with an occasion where the diffraction order numbers have the same sign, a large diffraction-angle difference can be provided by the diffracted light with wavelength λ1 and the diffracted light with wavelength λ3, which makes it possible to secure the width (a length in the direction perpendicular to the optical axis) of pitch of the step structure of the first basic structure to be wide and to provide objective lenses which are easily manufactured.

Since the present invention satisfies the expression (1), the step differences can be lowered than the occasion that d1 is defined to be 1.25λ1/(n−1), d1 is defined to be 2λ1/(n−1) or d1 is defined to be 5λ1/(n−1). It naturally makes shallow the microscopic grooves corresponding to the step structure formed on an optical-surface transfer surface of a mold that molds objective lenses, and makes their processing easy. Further, a material of the objective lens can easily enter the inner portion of the grooves and the moldability is naturally improved. Further, even if a light source with a short wavelength is employed, it controls fluctuations of diffraction efficiencies caused in the case of a wavelength fluctuation of the light source and of a temperature fluctuation to be low so that information may be recorded and/or reproduced stably.

Since the invention provides a structure that is extremely easy for manufacturing from the point of a step-difference amount in the optical axis direction and from the point of a pitch width in the direction perpendicular to the optical axis, as stated above, an effect of easy manufacturing is more remarkable when an optical path difference providing structure is provided on an optical surface of a single lens, in particular. Therefore, the present invention can be called an invention which is more suitable for an objective lens with a single body than other optical path difference providing structures. However, the present invention is not limited to an objective lens with a single body, and it can naturally be applied to an objective lens composed of two or more optical elements.

The objective lens described in item 2, according to item 1, is characterized by satisfying the following conditional expression.

$$0.5\lambda 1/(n-1) < d1 < 0.9\lambda 1/(n-1) \tag{1A}$$

The objective lens descried in item 3, according to item 1, is characterized by satisfying the following conditional expression.

$$0.55\lambda 1/(n-1) < d1 < 0.89\lambda 1/(n-1) \tag{1B}$$

The objective lens described in item 4, according to item 1, is characterized by satisfying the following conditional expression.

$$0.55\lambda 1/(n-1) < d1 < 0.79\lambda 1/(n-1) \tag{1C}$$

The objective lens described in item 5, according to items 1 or 2, is characterized by forming a converged spot on an information recording surface of a second optical disc including a protective layer with a thickness t2 (t1≦t2<t3) by using a second light flux with a wavelength λ2 (λ1<λ2<λ3) emitted from a second light source.

The objective lens described in item 6, according to item 5, is characterized in that a first-order diffracted light flux has a maximum diffracted-light amount among diffracted light fluxes generated when the first light flux enters the first basic structure, a minus-second-order diffracted light flux has a maximum diffracted-light amount among diffracted light fluxes generated when the second light flux enters the first basic structure, and a minus-second-order diffracted light flux has a maximum diffracted-light amount among diffracted light fluxes generated when the third light flux enters the first basic structure.

The objective lens descried in item 7, according to item 6, is characterized in that the first basic structure comprises a five-level step structure, and satisfies the following conditional expression.

$$0.7\lambda 1/(n-1) < d1 < 0.9\lambda 1/(n-1) \tag{1D}$$

The objective lens described in item 8, according to item 7, is characterized in that the first basic structure comprises a five-level step structure, and satisfies the following conditional expression.

$$0.7\lambda 1/(n-1) < d1 < 0.75\lambda 1/(n-1) \tag{1E}$$

The objective lens described in item 9, according to item 5, is characterized in that, a first-order diffracted light flux has a maximum diffracted-light amount among diffracted light fluxes generated when the first light flux enters the first basic structure, a minus-first-order diffracted light flux has a maximum diffracted-light amount among diffracted light fluxes generated when the second light flux enters the first basic structure, and a minus-first-order diffracted light flux has a maximum diffracted-light amount among diffracted light fluxes generated when the third light flux enters the first basic structure.

The objective lens described in item 10, according to item 9, is characterized in that the first basic structure comprises a three-level step structure, and satisfies the following conditional expression.

$$0.5\lambda 1/(n-1) < d1 < 0.8\lambda 1/(n-1) \tag{1F}$$

The objective lens described in item 11, according to the invention of any one of items 1 to 10, is characterized in that a diffraction efficiency of a diffracted light flux with a maximum diffracted-light amount among diffracted light fluxes generated when the first light flux enters the first basic structure is 50% or more, and a diffraction efficiency of a diffracted light flux with a maximum diffracted-light amount among diffracted light fluxes generated when the third light flux enters the first basic structure is 50% or more.

The objective lens described in item 12, according to the invention of any one of items 5 to 10, is characterized in that a diffraction efficiency of a diffracted light flux with a maximum diffracted-light amount among diffracted light fluxes generated when the first light flux enters the first basic structure is 50% or more, a diffraction efficiency of a diffracted light flux with a maximum diffracted-light amount among diffracted light fluxes generated when the second light flux enters the first basic structure is 50% or more, and a diffraction efficiency of a diffracted light flux with a maximum diffracted-light amount among diffracted light fluxes generated when the third light flux enters the first basic structure is 50% or more.

The objective lens described in item 13, according to the invention of any one of items 1 to 12, is characterized in that the optical surface of the objective lens comprises a first optical path difference providing structure in which the first basic structure and a second basic structure being an optical path difference providing structure are overlapped together.

The objective lens described in item 14, according to the invention of item 13, is characterized in that the first optical path difference providing structure comprises a step structure in which a plurality of ring-shaped step units are arranged concentrically about an optical axis as a center, and a step-difference amount d0 of a small step difference of the step unit, in the direction of the optical axis satisfies the following conditional expression, where n is a refractive index of the objective lens for the first light flux.

$$0.5\lambda 1/(n-1) < d0 < \lambda 1/(n-1) \quad (10)$$

The objective lens described in item 15, according to the invention of item 13 or 14, is characterized in that the second basic structure is a blaze structure, a second-order diffracted light flux has a maximum diffracted-light amount among diffracted light fluxes generated when the first light flux enters the second basic structure, a first-order diffracted light flux has a maximum diffracted-light amount among diffracted light fluxes generated when the second light flux enters the second basic structure, and a first-order diffracted light flux has a maximum diffracted-light amount among diffracted light fluxes generated when the third light flux enters the second basic structure.

The objective lens described in item 16, according to the invention of item 13 or 14, is characterized in that the second basic structure is a five-level step structure, a zero-th-order diffracted light flux has a maximum diffracted-light amount among diffracted light fluxes generated when the first light flux enters the second basic structure, a first-order diffracted light flux has a maximum diffracted-light amount among diffracted light fluxes generated when the second light flux enters the second basic structure, and a zero-th-order diffracted light flux has a maximum diffracted-light amount among diffracted light fluxes generated when the third light flux enters the second basic structure.

The objective lens described in item 17, according to the invention of item 13 or 14, is characterized in that the second basic structure is a four-level step structure, a second-order diffracted light flux has a maximum diffracted-light amount among diffracted light fluxes generated when the first light flux enters the second basic structure, a second-order diffracted light flux has a maximum diffracted-light amount among diffracted light fluxes generated when the second light flux enters the second basic structure, and a first-order diffracted light flux has a maximum diffracted-light amount among diffracted light fluxes generated when the third light flux enters the second basic structure.

The objective lens described in item 18, according to the invention of any one of items 13 to 15, is characterized in that, when the second basic structure is a blaze structure, the step structure of the first basic structure and the blaze structure of the second basic structure are overlapped together such that positions of all of step-difference sections of the second basic structure agree with positions of step-difference sections of the first basic structure.

The objective lens described in item 19, according to the invention of any one of items 13, 14, 16, and 17, is characterized in that, when the second basic structure is a step structure, the step structure of the first basic structure and the step structure of the second basic structure are overlapped together such that positions of all large step differences of the second basic structure agree with positions of large step differences of the first basic structure, or such that positions of large step differences of the second basic structure agree with positions of all large step differences of the first basic structure.

The objective lens described in item 20, according to the invention of any one of items 13 to 19, is characterized in that the step structure of the first basic structure and the blaze structure of the second basic structure are overlapped together such that repetition cycles of all the structures agree with each other.

The objective lens described in item 21, according to the invention of item 13, is characterized in that the optical surface of the objective lens comprises a first optical path difference providing structure in which the first basic structure and a second basic structure being an optical path difference providing structure are overlapped together, and, when the second basic structure is a blaze structure, the step structure of the first basic structure and the blaze structure of the second basic structure are overlapped together such that a position of at least one of step-difference sections of the second basic structure does not agree with positions of step-difference sections of the first basic structure.

The objective lens described in item 22, according to the invention of item 13, is characterized in that the optical surface of the objective lens comprises a first optical path difference providing structure in which the first basic structure and a second basic structure being an optical path difference providing structure are overlapped together, and, when the second basic structure is a step structure, the step structure of the first basic structure and the step structure of the second basic structure are overlapped together such that a position of at least one large step difference of the second basic structure does not agree with positions of large step differences of the first basic structure.

The objective lens described in item 23, according to the invention of any one of items 13, 21, and 22, is characterized in that the step structure of the first basic structure and the blaze structure or the step structure of the second basic structure are overlapped together such that repetition cycles do not agree with each other in at least a part of the structures.

An optical pickup apparatus described in item 24, is characterized by comprising the objective lens of any one of item 1 to 23.

An optical disc drive apparatus described in item 25, is characterized by comprising the optical pickup apparatus of item 24.

The optical pickup apparatus forms a converged spot on an information recording surface of an optical disc by using a light flux emitted from a light source, to record and/or reproduce information for the optical disc.

An optical pickup apparatus relating to the present invention comprises at least two light sources including a first light source and a third light source, and may further comprise a second light source. The optical pickup apparatus relating to the present invention comprises a light-converging optical system for converging the fast light flux on an information recording surface of the first optical disc and for converging the third light flux on an information recording surface of the third optical disc. Further, the optical pickup apparatus may be configured to converge the second light flux on an information recording surface of the second optical disc by the light-converging optical system. The optical pickup apparatus relating to the present invention comprises a light-receiving element for receiving light reflected on an information recording surface of the first optical disc or the third optical disc. The optical pickup apparatus may further comprises a light-receiving element for receiving light reflected on an information recording surface of the second optical disc. Herein, it is preferable that the first optical disc is a BD (Blu-ray Disc) or HD DVD (referred as HD), the second optical disc is a DVD, and the third optical disc is a CD. However, the discs are not limited to those. Each of the first optical disc, the second optical disc, and the third optical disc may be a multilayered optical disc including plural information recording layers. In other words, the present invention is applied to an optical pickup apparatus including just two light sources to handle two kinds of optical disc of the first optical disc and the third optical disc, and to an objective lens employed for the same. Further, the present invention is also applied to an optical pickup apparatus including three light sources to handle the second optical disc additionally to the first optical disc and the third optical disc, and to an objective lens employed for the same. Furthermore, the present invention is naturally applied to an optical pickup apparatus handling four or more kinds of optical disc, and to an objective lens employed for the same.

As for a BD, information is recorded and/or reproduced with an objective lens with NA of 0.85, and it has a protective layer with a thickness about 0.1 mm. As for a HD, information is recorded and/or reproduced with an objective lens with NA of 0.65 to 0.67, and it has a protective layer with a thickness about 0.6 mm. A DVD represents a generic name of optical discs wherein information is recorded and/or reproduced with an objective lens with NA in the range of about 0.60 to 0.67 and its protective layer has a thickness about 0.6 mm, and involves DVD-ROM, DVD-Video, DVD-Audio, DVD-RAM, DVD-R, DVD-RW, DVD+R and DVD+RW. In the present specification, a CD represents a generic name of optical discs wherein information is recorded and/or reproduced by an objective lens with NA in the range of about 0.45 to 0.53 and its protective layer has the thickness about 1.2 mm, and involves CD-ROM, CD-Audio, CD-Video, CD-R and CD-RW. As for a recording density, a BD has the highest recording density, and recording densities of a HD, DVD and CD decreases in this order.

Thicknesses t1, t2, and t3 of the protective substrates preferably satisfy the following conditional expressions (2), (3), and (4). However, the thicknesses are not limited to them.

$$0.0750 \text{ mm} \leq t1 \leq 0.1125 \text{ mm or } 0.5 \text{ mm} \leq t1 \leq 0.7 \text{ mm} \quad (2)$$

$$0.5 \text{ mm} \leq t2 \leq 0.7 \text{ mm} \quad (3)$$

$$1.0 \text{ mm} \leq t3 \leq 1.3 \text{ mm} \quad (4)$$

In these expressions, a thickness of a protective substrate means a thickness of a protective substrate formed on a surface of an optical disc. In other words, it means a thickness of a protective substrate from a surface of an optical disc to an information recording surface at the closest position to the surface.

In the present specification, each of the first light source and the third light source (and the second light source) is preferably a laser light source. Lasers such that a semiconductor laser, and a silicon laser are preferably used for the laser light source. The first wavelength $\lambda 1$ of the first light flux emitted from the first light source, the second wavelength $\lambda 2$ ($\lambda 2 > \lambda 1$) of the second light flux emitted from the second light source, and the third wavelength $\lambda 3$ ($\lambda 3 > \lambda 2$) of the third light flux emitted from the third light source, are preferable to satisfy the following conditional expressions (5) and (6).

$$1.5 \times \lambda 1 < \lambda 2 < 1.7 \times \lambda 1 \quad (5)$$

$$1.7 \times \lambda 1 < \lambda 3 < 2.3 \times \lambda 1 \quad (6)$$

When a BD or HD, DVD, and CD are employed as the first optical disc, the second optical disc, and the third optical disc, respectively, the wavelength $\lambda 1$ of the first light source is preferably 0.35 μm or more, and 0.44 μm or less, and is more preferably 0.39 μm or more, and 0.42 μm or less; the second wavelength $\lambda 2$ of the second light source is preferably 037 μm or more, and 0.68 μm or less, and is more preferably 0.63 μm or more, and 0.67 μm or less; and the third wavelength $\lambda 3$ of the third light source is preferably 0.75 μm or more, and 0.85 μm or less, and is more preferably 0.76 μm or more, and 0.82 μm or less.

Further, at least two light sources of the first light source, the second light source, and the third light source may be unitized. The unitization means fixing and housing, for example, the first light source and the second light source into one package. However, it is not limited to the above, the unitization in a broad sense involves a situation that two light sources are fixed so that aberration can not be corrected. Further, in addition to the light source, the light-receiving element which will be described later, may also be provided as one package.

As the light-receiving element, a photo detector such as a photo diode is preferably used. Light reflected on an information recording surface of an optical disc enters into the light-receiving element, and signal outputted from the light-receiving element is used for obtaining the read signal of information recorded in each optical disc. Further, a change in the light amount caused with a change in shape and a change in position of a spot on the light-receiving element, are detected to conduct a focus detection and a tracking detection. Based on these detections, the objective lens can be moved for focusing and tracking operations. The light-receiving element may be composed of a plurality of photo detectors. The light-receiving element may also have a main photo detector and secondary photo detector. For example, the light-receiving element is provided with a main photo detector which receives the main light used for recording and/or reproducing information, and two secondary photo detectors positioned on both sides of the main photo detector, so as to receive secondary light for tracking adjustment by the two secondary photo detectors. Further, the light-receiving element may also comprise a plurality of light-receiving elements corresponding to respective light sources.

The light-converging optical system comprises an objective lens. The light-converging optical system may comprise only an objective lens. However, the light-converging optical system may further comprise a coupling lens such as a collimation lens other than the objective lens. The coupling lens is arranged between the objective lens and the light source and means a single lens or a lens group which changes divergent angle of a light flux. The collimation lens is a kind of coupling lens and is a lens to convert a light flux which has entered the collimation lens into a parallel light flux and to emit the resulting light. Further, the light-converging optical system may also comprise an optical element such as a diffractive optical element which divides a light flux emitted from a light source into a main light flux used for recording and reproducing information and two secondary light fluxes used for operations such as a tracking operation. In the present specification, an objective lens means an optical system which is arranged to face an optical disc in an optical pickup apparatus and has a function to converge a light flux emitted from a light source onto an information recording surface of the optical disc. Preferably, the objective lens is an optical system which is arranged to face an optical disc in an optical pickup apparatus, has a function to converge a light flux emitted from a light source on an information recording surface of the optical disc, and is movable as one body in the direction of at least the optical axis by an actuator. The objective lens is preferable an objective lens with one body, but may be formed of a plurality of optical elements. The objective lens may be a glass lens, a plastic lens or a hybrid lens in which an optical path difference providing structure is formed on the glass lens by using thermosetting resin. The objective lens may comprise a refractive surface which is an aspheric surface. Further, in the objective lens, it is preferable that a base surface on which an optical path difference providing structure is provided is a aspheric surface. In the view point of easiness of manufacturing an optical path difference providing structure, the effect of the present invention is significantly exhibited especially when an objective lens with a single body is employed.

Further, when the objective optical element is a glass lens, it is preferable that a glass material with a glass transition point Tg of 500° C. or less is used, and the a glass transition point Tg is more preferably 480° C. or less. By using the glass material whose glass transition point Tg is 500° C. or less, the material can be molded at a comparatively low temperature. Therefore, the life of the mold can be prolonged.

Hereupon, a glass lens generally has larger specific gravity than a resin lens. Therefore, the objective lens made of glass has larger weight and applies a larger burden to an actuator which drives the objective lens. Therefore, when a glass lens is employed for the objective lens, a glass material having small specific gravity is preferably used for the objective lens. Specifically, the specific gravity is preferably 3.0 or less, and is more preferably 2.75 or less.

As concrete examples of such a glass material, there are cited Examples 1 to 12 in JP-A No. 2005-306627. For example, Example 1 of JP-A No. 2005-306627 discloses glass transition point Tg of 460° C., specific gravity of 2.58, refractive index nd of 1.594, and Abbe number of 59.8.

Further, when a plastic lens is employed for the objective lens, it is preferable that a resin material of cyclic olefins is used for the objective lens. In the cyclic olefins, there is more preferably used the resin material having: a refractive index at the temperature 25° C. for wavelength 405 nm, which is within the range of 1.52 to 1.60; and a ratio of refractive index change dN/dT ($°C.^{-1}$) caused by a temperature change within the temperature range of −5° C. to 70° C. for the wavelength 405 nm, which is within the range of $-20 \times 10^{-5}$ to $-5 \times 10^{-5}$ (more preferably, $-10 \times 10^{-5}$ to $-8 \times 10^{-5}$). Further, when a plastic lens is employed for the objective lens, it is preferable that a plastic lens is also employed for the coupling lens.

The Abbe number of a material forming the objective lens is preferably 50 or more.

The objective lens will be described below. There is formed at least a first basic structure being an optical path difference providing structure on an optical surface of the objective lens. At least one optical surface of the objective lens comprises a central area and a peripheral area around the central area. When the objective lens is configured to be applied to an optical pickup apparatus including the second light source additionally to the first light source and the third light source, the at least one optical surface of the objective lens may further comprise a most peripheral area around the peripheral area. The central area preferably is an area including the optical axis of the objective lens. Alternatively, there may be provided a small area including the optical axis as an unused area or an area for a special use, and the central area may be provided around the small area. It is preferable that the central area, peripheral area, and most peripheral area are provided on the same optical surface. As shown in FIGS. 1a and 1b, it is preferable that the central area CN, peripheral area MD, most peripheral area OT are provided concentrically around the optical axis as the center, on the same optical surface. In the central area of the objective lens, there is preferably formed a first optical path difference providing structure which is formed by only a first basic structure or which is formed by overlapping a first basic structure and a second basic structure together. When the objective lens is configured to be applied to an optical pickup apparatus including just the first light source and the third light source, the peripheral area may by a refractive surface or an area on which a second optical path difference providing structure is formed. When the objective lens is configured to be applied to an optical pickup apparatus further including the second light source additionally to the first light source and the third light source, the second optical path difference providing structure is preferably formed on the peripheral area. When there is provided a most peripheral area, the most peripheral area may be a refractive surface, or a third optical path difference providing structure may be formed in the most peripheral area. It is preferable that each of the central area, peripheral area, and most peripheral area adjoins to the neighboring area, however, there may be slight gaps between them.

The area where the first basic structure or the first optical path difference providing structure is provided is preferably 70% or more of the area of the central area on the objective lens. It is more preferably 90% or more of the area of the central area. The first basic area or the first optical path difference providing structure is furthermore preferably provided on the entire of the central area. The area where the second optical path difference providing structure is provided is preferably 70% or more of the peripheral area on the objective lens. It is more preferably 90% or more of the area of the peripheral area. The second optical path difference providing structure is further more preferably provided on the entire of the peripheral area. The area where the third optical path difference providing structure is provided, is 70% or more of the area of the most peripheral area on the objective lens. It is more preferably 90% or more of the area of the most peripheral area. The third optical path difference providing structure is more preferably provided on the entire of the most peripheral area.

An optical path difference providing structure used in the present specification, is a general name of the structure by which an optical path difference is provided to an incident light flux. An optical path difference providing structure also involves a phase difference providing structure by which a phase difference is provided. Further, a phase difference providing structure involves a diffraction structure. The optical path difference providing structure comprises a step, and preferably comprises a plurality of steps. This step provides an optical path difference and/or phase difference to an incident light flux. The steps may be arranged with periodic interval in the perpendicular direction to the optical axis, or may be arranged with non-periodic interval in the perpendicular direction to the optical axis. The optical path difference providing structure is preferably a diffraction structure. Each of the first basic structure and the second basic structure is an optical path difference providing structure, and also is a diffraction structure.

It is preferable that the optical path difference providing structure includes a plurality of ring-shaped zones arranged concentrically around the optical axis as a center. Further, the optical path difference providing structure can have various sectional shapes (sectional shapes in a plane including the optical axis). Especially, the first optical path difference providing structure preferably is formed only by the first basic structure whose shape in a cross section including the optical axis is a step structure (involving a blaze-type step structure which will be described later), or preferably is a structure formed by overlapping the first basic structure whose shape in a cross section including the optical axis is a step structure (involving ablaze-type step structure) and the second basic structure whose shape in a cross section including the optical axis is a blaze structure or a step structure, together.

The blaze structure means that the shape in a cross section including the optical axis of an optical element having the optical path difference providing structure is a serrated shape, and the optical path difference providing structure includes surfaces which incline against the base surface, without being perpendicular to the base surface and without being in parallel with the base surface.

Further, the step structure means that the shape in a cross section including the optical axis of an optical element having the optical path difference providing structure has a plurality of small step-shaped bodies (that is called step units), as shown in FIGS. 2c and 2d. Incidentally, in the present description, "X level" means that ring-shaped surfaces (that are sometimes called terrace surfaces in the following description and are surfaces represented as T in FIGS. 2c and 2d) corresponding to (extending along) the perpendicular direction to the optical axis in one step unit in the step structure, are provided by being separated by step differences and are divided into groups each including ring-shaped surfaces in quantity of X. The expression "small step difference" means the smallest step difference in the optical axis direction in one step unit, while, the expression "large step difference" means the largest step difference in the optical axis direction in one step unit.

In a step structure, a length of one step unit in the perpendicular direction to the optical axis is called a pitch width, and a length in the optical axis direction of a small step difference of one step unit is represented by step-difference amount (d1 or d0) in the optical axis direction. It is preferable that the step differences extend in parallel with the optical axis or mostly in parallel with the optical axis. On the other hand, terrace surfaces may extend in parallel with the base surface or may extends with inclining against the base surface. A step structure including surfaces which incline against the base surface is called ablaze-type step structure. The blaze-type step structure is a type of the step structure.

For example, FIG. 2c shows a five-level step structure, wherein a small step difference is a step difference indicated by d1c, and a large step difference is a step difference indicated by d2c. A pitch width is a length represented by P, and a step-difference amount of a small step difference in the optical axis direction is a length indicated by d1c. FIG. 2d shows a two-level step structure, wherein a small step difference is a step difference indicated by d1d and a large step difference is a step difference indicated by d2d (In this example, the small step difference d1d and large step difference d2d are the same in terms of a step-difference amount), a pitch width is a length represented by P and a step-difference amount in the optical axis direction of a small step difference is a length represented by d1d.

Meanwhile, it is preferable that the optical path difference providing structure is a structure in which a certain unit form is repeated periodically. The expression "a unit form is repeated periodically" in the present description naturally involves a shape in which the same unit is repeated on the constant cycle. Further, a structure in which "a unit form is repeated periodically" also involves a shape such that a unit form provided as one unit of the cycle changes regularly such that its cycle is gradually elongated or shortened.

When the optical path difference providing structure includes a blaze structure, there is formed a shape in which serrated shape representing a unit shape is repeated. It may have a shape in which the same serrated shape is repeated as shown in FIG. 2a, or a shape in which the size of the serrated shape becomes larger or smaller gradually as its position goes in the direction of the base surface as shown FIG. 2b. Further, it may have shape in which the shape including serrated shapes gradually becoming larger and the shape including serrated shapes gradually becoming smaller are combined. In these shapes, it is preferable that the sizes of step-difference amounts along the optical axis direction (or the direction of traveling light) are not almost changed in the serrated shape, even when the sizes of the serrated shapes change gradually. Additionally, there can be provided the shape that step differences of the blaze structure face the side opposite to the optical axis (center) in a certain area, step differences of the blaze structure face the side of the optical axis (center) in the other area, and a transition area which is required to switch the orientation of step differences of the blaze structure is positioned between those areas. The transition area is an area corresponding to a point that represents the extreme value of an optical path difference function where the optical path difference added by the optical path difference providing structure is represented by the optical path difference function. When the optical path difference function includes an extreme value, a slope of the optical path difference function becomes small, which enables the pitch of ring-shaped surfaces to be wide and controls a deterioration of transmittance caused by form errors of the optical path difference providing structure.

When the optical path difference providing structure includes a step structure, there can be a shape such that a five-level step unit shown in FIG. 2c is repeated. Further, there may be taken a shape wherein widths of terrace surfaces of the step becomes gradually greater or smaller as a position of the surface goes in the direction of the base surface. In these structures, it is preferable that step-difference amounts in the optical axis direction are not almost changed.

A first basic structure will be described in detail as follows. The first basic structure is an optical path difference providing structure, and it is a step structure wherein plural ring-shaped step units are arranged concentrically around the optical axis as the center. The first basic structure may either be an ordinary step structure or be ablaze-type step structure. Further, the first basic structure is a structure for realizing compatibility between at least the first optical disc and the third optical disc. Therefore, it is preferable that the first basic structure corrects the first and third light fluxes which pass through the first basic structure, in terms of spherical aberrations caused by a difference between protective substrate thickness t1 of the first optical disc and protective substrate thickness t3 of the third optical disc and/or spherical aberrations caused by a difference between a wavelength of the fast light flux and that of the third light flux. When the objective lens is used for realizing compatibility between two optical discs including the first optical disc and the third optical disc, it is enough that the objective lens has at least the first basic structure.

In this case, it is preferable that the step-difference amount d1 in the optical axis direction of a small step difference of the step unit of the first basic structure, in the optical axis direction satisfies the following conditional expression.

$$0.5\lambda 1/(n-1) < d1 < \lambda 1/(n-1) \quad (1)$$

In the above expression, n represents a refractive index of the objective lens for the first light flux.

When the aforesaid expression (1) is satisfied, a step-difference amount in the optical axis direction of a small step difference in the step unit can be made small, microscopic grooves corresponding to the step structure that is formed on an optical-surface transfer surface of a mold that molds objective lenses can be made to be shallow, thereby, processing becomes to be easy. Further, a material of the objective lens can easily enter the inner portion of the grooves, and the moldability is enhanced. Further, it is possible to control fluctuations of diffraction efficiency in the case of fluctuations of wavelength of the light source and of fluctuations of temperature to be small so that recording and/or reproducing of information may be carried out stably.

In addition, by satisfying the expression (1), optical path difference H1 which is caused on a small step difference when the first light flux passes the first basic structure, and optical path difference H3 which is caused on a small step difference when the third light flux passes the first basic structure achieve a relationship that a decimal portion of the optical path difference H1 is larger than 0.5 and a decimal portion of the optical path difference H3 is smaller than 0.5. Thereby, a diffraction order number of diffracted light with wavelength λ1 and a diffraction order number of diffracted light with wavelength λ3 become to be in a relationship that their signs are different from each other. Therefore, compared with an occasion where the diffraction order numbers have the same sign, a large diffraction-angle difference can be provided by the diffracted light with wavelength λ1 and by the diffracted light with wavelength λ3, which makes it possible to secure a width (a length in the direction perpendicular to the optical axis) of pitch of the step structure of the first basic structure to be wide and to provide objective lenses which are easily manufactured.

Further, it is possible to improve the diffraction efficiency of the third light flux while the diffraction efficiency of the first light flux is kept to be high without the diffraction efficiency of the first light flux being lowered greatly.

The first optical path difference providing structure preferably satisfies the following conditional expression (10). Under the situation that the first optical path difference providing structure includes only the first basic structure, when the first optical path difference providing structure satisfies the conditional expression (1), it automatically satisfies the conditional expression (10) simultaneously. The reason why satisfying of the conditional expression (10) by the first optical path difference providing structure is preferable is the same as the reason why satisfying of the conditional expression (1) by the aforesaid first basic structure is preferable.

$$0.5\lambda 1/(n-1)<d0<\lambda 1/(n-1) \tag{10}$$

In the above expression, d0 represents a step-difference amount of a small step difference (μm) in the optical axis direction in the case where the first optical path difference providing structure is a step structure, and n represents a refractive index of the objective lens for the first light flux.

When the first wavelength is around 0.405 μm and the third wavelength is around 0.785 μm, satisfying the following expression (1') is preferable for making the diffraction order number of the diffracted light with wavelength λ1 and the diffraction order number of the diffracted light with wavelength λ3 to be in relationship of the same sign.

$$0.5\lambda 1/(n-1)<d1<0.97\lambda 1/(n-1) \tag{1'}$$

It is more preferable if step-difference amount d1 in the optical axis direction satisfies the following conditional expression.

$$0.5\lambda 1/(n-1)<d1<0.9\lambda 1/(n-1) \tag{1A}$$

It is more preferable if step-difference amount d1 in the optical axis direction satisfies the following conditional expression.

$$0.55\lambda 1/(n-1)<d1<0.89\lambda 1/(n-1) \tag{1B}$$

By satisfying the aforesaid expression (1B), the diffraction efficiency of 50% or more is obtained for each of the first and third light fluxes, which is preferable.

It is more preferable if step-difference amount d1 in the optical axis direction satisfies the following conditional expression.

$$0.56\lambda 1/(n-1)<d1<0.84\lambda 1/(n-1) \tag{1B'}$$

It is more preferable if step-difference amount in the optical axis direction d1 satisfies the following conditional expression.

$$0.55\lambda 1/(n-1)<d1<0.79\lambda 1/(n-1) \tag{1C}$$

By satisfying the aforesaid expression (1C), the diffraction efficiency of 50% or more is obtained for each of the first, second and third light fluxes, which is preferable.

It is more preferable if step-difference amount in the optical axis direction d1 satisfies the following conditional expression.

$$0.56\lambda 1/(n-1)<d1<0.74\lambda 1/(n-1) \tag{1C'}$$

Further, it is preferable that the first optical path difference providing structure satisfies the following conditional expressions (10') through (10C'). Under the condition that the first optical path difference providing structure includes only the first basic structure, the following conditional expressions (10') through (10C') are satisfied simultaneously, when the conditional expressions (1')-(1C') are satisfied.

$$0.5\lambda 1/(n-1)<d0<0.97\lambda 1/(n-1) \tag{10'}$$

$$0.5\lambda 1/(n-1)<d0<0.9\lambda 1/(n-1) \tag{10A}$$

$$0.55\lambda 1/(n-1)<d0<0.89\lambda 1/(n-1) \tag{10B}$$

$$0.56\lambda 1/(n-1)<d0<0.84\lambda 1/(n-1) \tag{10B'}$$

$$0.55\lambda 1/(n-1)<d0<0.79\lambda 1/(n-1) \tag{10C}$$

$$0.56\lambda 1/(n-1)<d0<0.74\lambda 1/(n-1) \tag{10C'}$$

The reason why satisfying of the conditional expressions (10')-(10C') by the first optical path difference providing structure is preferable is the same as the reason why satisfying of the conditional expressions (1')-(1C') by the aforesaid first basic structure is preferable.

Further, with respect to the first basic structure, when a step-difference amount in the optical axis direction of a small step difference of the step unit is expressed by d1=h1·λ1/(n−1) and it is expressed by d1=h3·λ3/(n3−1) (where n3 represents the refractive index of the objective lens for the third light flux), h1=d1·(n−1)/λ1 and h3=d3 (n3−1)/λ3 hold. In the expressions, a value of each of |J1−h1|·L and |J3−h3|·L is preferably closer to an integer, because higher efficiencies can be obtained for BD and CD, where J1 is an integer that is obtained when h1 is rounded at the first decimal point, J3 is an integer that is obtained when h3 is rounded at the first decimal point, and L represents the number of levels of the step structure. In other words, the highest efficiency is obtained when the values obtained by multiplying the optical path difference coming from a small step difference by L are equal to the multiple of an integer of a wavelength, and the higher efficiencies are obtained when the values are closer to the integer. Integer values closest to |J1−h1|·L and |J3−h3|·L agree with an absolute values of the diffraction order numbers for BD and CD, respectively. More specifically, it is desirable that a decimal portions of |J1−h1|·L and |J3−h3|·L are smaller than 0.4, or they are greater than 0.6. Further, it is desirable that the decimal portions of |J1−h1|·L and |J3−h3|·L are smaller than 0.2, or they are greater than 0.8.

As stated above, by satisfying the conditional expression (1), a plus or minus signs of the diffraction order number of the diffracted light flux having the maximum diffracted-light amount among diffracted light fluxes generated when the first light flux with wavelength λ1 enters the first basic structure are different from a plus or minus sign of the diffraction order number of the diffracted light flux having the maximum diffracted-light amount among diffracted light fluxes generated when the third light flux with wavelength λ3 enters the first basic structure.

When considering only diffractive actions from the first basic structure excluding diffractive actions from the base surface (which is also called a base aspheric surface), plus or minus signs of the diffraction order numbers can be said to be different from each other under one of the following conditions: the condition that the first light flux having passed the first basic structure has more advanced phase at a position farther from the optical axis and the third light flux having passed the first basic structure has more delayed phase at a position farther from the optical axis, and the condition that the first light flux having passed the first basic structure has more delayed phase at a position farther from the optical axis and the third light flux having passed the first basic structure has more advanced phase at a position farther from the optical axis. When the first basic structure is a structure formed by repeating a step unit, the above advance of phase and delay of phase are caused in one step unit as a unit structure. When the diffractive action deflects a light flux in the direction to be more convergent, in comparison with the condition that a light flux is affected only by a refractive action, the diffraction order number is considered as positive. When the diffractive action deflects a light flux in the direction to be more divergent, in comparison with the condition that a light flux is affected only by a refractive action, the diffraction order number is considered as negative. As for the first light flux which has passed through the first basic structure, it is preferable that the diffracted light with a positive diffraction order number has the maximum diffracted-light amount. The reason for the foregoing is as follows. When the first optical disc for which the first light flux is used is compared with the third optical disc for which the third light flux is used, a thickness of a protective layer of the third optical disc is thicker than the other, thus, the third light flux needs to be changed to a tendency of divergence by diffracting actions and the first light flux needs to be changed to a tendency of convergence, in order to secure a sufficient working distance.

Further, when the optical pickup apparatus includes a second light source in addition to the first and third light sources, and when the objective lens forms a converged spot on an information recording surface of the second optical disc including a protective layer with a thickness t2 by using the second light flux with wavelength λ2, a plus or minus sign of the diffraction order number of the diffracted light whose diffracted-light amount is maximum among diffracted light fluxes generated when the first light flux with wavelength λ1 enters the first basic structure are preferably different from a plus or minus sign of the diffraction order number of the diffracted light whose diffracted-light amount is maximum among diffracted light fluxes generated when the second light flux with wavelength λ2 enters the first basic structure.

When $1.5 \cdot \lambda 1 < \lambda 2 < 1.7 \cdot \lambda 1$ holds, in order to make the plus or minus sign of the diffraction order number of the diffracted light having the maximum diffracted-light amount among diffracted light fluxes generated when the first light flux with wavelength λ1 enters the first basic structure different from the plus or minus sign of the diffraction order number of the diffracted light having the maximum diffracted-light amount among diffracted light fluxes generated when the second light flux with wavelength λ2 enters the first basic structure, it is preferable that the following expression (1X) is satisfied.

$$0.5\lambda 1/(n-1) < d1 < 0.83\lambda 1/(n-1) \tag{1X}$$

Because, a decimal portion of optical path difference H1 becomes larger than 0.5 when an inequality sign on the left side of the expression (1X) is satisfied. Further, by satisfying an inequality sign on the right side of the expression (1X), a decimal portion of optical path difference H2 becomes smaller than 0.5 based on relationship between λ1 and λ2. Owing to those, the diffraction order number for wavelength λ1 and the diffraction order number for wavelength λ2 has a relationship of different signs.

Further, as stated above, the first basic structure may also be a blaze-type step structure in which terrace surfaces of step units are not formed to be parallel with the base surface and are inclined as shown in FIG. 10. By inclining the terrace surfaces, it is possible to change a way of being connected for wavefronts generated on the terrace surfaces, whereby, it is possible to adjust diffraction efficiencies for the first light flux with wavelength λ1, the second light flux with wavelength λ2 and the third light flux with wavelength λ3 without changing the diffraction order numbers of the diffracted light fluxes whose amount of generation is the maximum.

An example of more specific and more preferable structure of the first basic structure will be shown below. The first optical path difference providing structure may be composed of the first basic structure alone. In particular, when the objective lens is used only for two of the first light flux and the third light flux, it is preferable that the first optical path difference providing structure is composed only of the first basic structure.

(First Example of the First Basic Structure)

In the present example, |L|=1, |M|=2 and |N|=2 hold, under the assumption that L-th diffracted light flux has the maximum diffracted-light amount among the diffracted light fluxes generated when the first light flux enters the first basic structure, M-th diffracted light flux has the maximum diffracted-light amount among the diffracted light fluxes generated when the second light flux enters the first basic structure, and N-th diffracted light flux has the maximum diffracted-light amount among the diffracted light fluxes generated when the third light flux enters the first basic structure. In the above expressions, M and N have the same positive or negative sign, and L has the different sign from those of M and N. It is preferable that L is +1, M is −2, and N is −2.

The first basic structure in the present example has a five-level step structure. Further, it is a step structure in which terrace surfaces are parallel with the base surface. It is further preferable that the following conditional expression is satisfied.

$$0.7\lambda 1/(n-1) < d1 < 0.9\lambda 1/(n-1) \tag{1D}$$

When the aforesaid conditional expression is satisfied, high diffraction efficiencies can be obtained for the first light flux and the third light flux, which is preferable.

It is mom preferable that the following conditional expression is satisfied.

$$0.72\lambda 1/(n-1) < d1 < 0.88\lambda 1/(n-1) \tag{1D'}$$

Further, from the viewpoint of obtaining high diffraction efficiencies for all of the first light flux, the second light flux and the third light flux, it is preferable that the following conditional expression is satisfied.

$$0.7\lambda 1/(n-1) < d1 < 0.75\lambda 1/(n-1) \tag{1E}$$

It is more preferable that the following conditional expression is satisfied.

$$0.72\lambda 1/(n-1) < d1 < 0.74\lambda 1/(n-1) \tag{1E'}$$

More specifically, for example, there are given the structure which is shown in FIG. 6 and in the following Table 1. The structure is a five-level step structure that generates the plus-first-order diffracted light with the maximum amount for λ1, the minus-second-order diffracted light with the maximum amount for λ2 and the minus-second-order diffracted light with the maximum amount for λ3, where λ1 is 0.405 μm, n is 1.605367 and d1 is 0.52 μm. Namely, d1 is 0.77λ1/(n−1). Therefore, conditional expression (1D') is satisfied, and it is possible to obtain diffraction efficiencies of 50% or more for the first light flux and the third light flux as shown in Table 1. In other words, it is possible to keep high diffraction efficiencies for the first light flux and the third light flux,

TABLE 1

5-level
Height of one step: d1 = 0.52 μm
Inclination of one step: 0 μm

|  | BD | DVD | CD |
|---|---|---|---|
| Wavelength | λ1 = 405 nm | λ2 = 655 nm | λ3 = 785 nm |
| Refractive index | 1.605367 | 1.586000 | 1.581901 |
| Diffraction order number | +1 | −2 | −2 |
| Optical path difference for a height of one step | 0.77λ1 | 0.46λ2 | 0.38λ3 |
| Diffraction efficiency | 82% | 42% | 56% |

Further, FIG. 7 is a graph that shows how diffraction efficiencies for the first-order diffracted light for λ1, the minus-second-order diffracted light for λ2 and the minus-second-order diffracted light for λ3 are fluctuated, when an optical path difference generated on one small step difference is changed, which is obtained by changing step-difference amount d1 in the optical axis direction of a small step difference, while keeping the five-level step structure, in the first basic structure, based on the example shown in FIG. 6. This graph shows that 50% or more diffraction efficiencies can be maintained for the first light flux and the third light flux when an optical path difference is within a range of about 0.72λ1-0.88λ1, and that 50% or more diffraction efficiencies can be maintained for the first light flux, the second light flux and the third light flux when an optical path difference is within a range of about 0.72λ1-0.74λ1.

(Second Example of the First Basic Structure)

In the present example, |L|=1, |M|=1 and |N|=1 hold, under the assumption that L-th diffracted light flux has the maximum diffracted-light amount among the diffracted light fluxes generated when the first light flux enters the first basic structure, M-th diffracted light flux has the maximum diffracted-light amount among the diffracted light fluxes generated when the second light flux enters the first basic structure, and N-th diffracted light flux has the maximum diffracted light amount among the diffracted light fluxes generated when the third light flux enters the first basic structure. In the above expressions, M and N have the same positive or negative sign, and L has the different sign from those of M and N. It is preferable that L is +1, M is −1, and N is −1.

The first basic structure in the present example has a three-level step structure. Further, it is a step structure in which terrace surfaces are parallel with the base surface. It is further preferable that the following conditional expression is satisfied, $$0.5\lambda 1/(n-1)<d1<0.8\lambda 1/(n-1) \quad (1F)$$

When the aforesaid conditional expression is satisfied, high diffraction efficiencies can be obtained for the first light flux and the third light flux, which is preferable.

It is more preferable that the following conditional expression is satisfied.

$$0.56\lambda 1/(n-1)<d1<0.77\lambda 1/(n-1) \quad (1F')$$

Further, from the viewpoint of obtaining high diffraction efficiencies for all of the first light flux, the second light flux and the third light flux, it is preferable that the following conditional expression is satisfied.

$$0.5\lambda 1/(n-1)<d1<0.75\lambda 1/(n-1) \quad (1G)$$

It is more preferable that the following conditional expression is satisfied.

$$0.56\lambda 1/(n-1)<d1<0.74\lambda 1/(n-1) \quad (1G')$$

More specifically, for example, there are given a structure which are shown in FIG. 8 and in the following Table 2. The structure is a three-level step structure that generates the plus-first-order diffracted light with the maximum amount for λ1, the minus-first-order diffracted light with the maximum amount for λ2 and the minus-first-order diffracted light with the maximum amount for λ3, where λ1 is 0.405 μm, n is 1.605367 and d1 is 0.43 μm. Namely, d1 is 0.64λ1/(n−1). Therefore, conditional expression (1G') is satisfied, and it is possible to obtain diffraction efficiencies of 50% or more for all of the first light flux, the second light flux and the third light flux as shown in Table 2. In other words, it is possible to keep high diffraction efficiencies for all of the fast light flux, the second light flux and the third light flux.

TABLE 2

3-level
Height of one step: d1 = 0.43 μm
Inclination of one step: 0 μm

|  | BD | DVD | CD |
|---|---|---|---|
| Wavelength | λ1 = 405 nm | λ2 = 655 nm | λ3 = 785 nm |
| Refractive index | 1.605367 | 1.586000 | 1.581901 |
| Diffraction order number | +1 | −1 | −1 |
| Optical path difference by a height of one step | 0.64λ1 | 0.38λ2 | 0.32λ3 |
| Diffraction efficiency | 67% | 64% | 68% |

Further, FIG. 9 is a graph that shows how diffraction efficiencies for the first-order diffracted light for λ1, the minus-first-order diffracted light for λ2 and the minus-first-order diffracted light for λ3 are fluctuated, when an optical path difference generated by one small step difference is changed, which is obtained by changing step-difference amount d1 in the optical axis direction of a small step difference, while keeping the three-level step structure, in the first basic structure, based on the example shown in FIG. 8. This graph shows that 50% or more diffraction efficiencies can be maintained for the first light flux and the third light flux when an optical path difference is within a range of about 0.56λ1-0.77λ1, and that 50% or more diffraction efficiencies can be maintained for the first light flux, the second light flux and the third light flux when an optical path difference is within a range of about 0.56λ1-0.74λ1.

(Third Example of the First Basic Structure)

In the present example, |L|=1, |M|=2 and |N|=2 hold, under the assumption that L-th diffracted light flux has the maximum diffracted-light amount among the diffracted light fluxes generated when the first light flux enters the first basic structure, M-th diffracted light flux has the maximum diffracted-light amount among the diffracted light fluxes generated when the second light flux enters the first basic structure, and N-th diffracted light flux has the maximum diffracted-light amount among the diffracted light fluxes generated when the third light flux enters the first basic structure. In the above expressions, M and N have the same positive or negative sign, and L has the different sign from those of M and N. It is preferable that L is +1, M is −2, and N is −2.

The first basic structure in the present example has a five-level step structure. Further, the present example is a blaze-type step structure in which terrace surfaces are inclined. It is further preferable that the following conditional expression is satisfied.

$$0.55\lambda 1/(n-1) < d1 < 0.75\lambda 1/(n-1) \quad (1H)$$

When the aforesaid conditional expression is satisfied, high diffraction efficiencies can be obtained for the first light flux and the third light flux, which is preferable.

It is more preferable that the following conditional expression is satisfied.

$$0.59\lambda 1/(n-1) < d1 < 0.71\lambda 1/(n-1) \quad (1H')$$

Further, from the viewpoint of obtaining high diffraction efficiencies for all of the first light flux, the second light flux and the third light flux, it is preferable that the following conditional expression is satisfied.

$$0.55\lambda 1/(n-1) < d1 < 0.67\lambda 1/(n-1) \quad (1I)$$

It is more preferable that the following conditional expression is satisfied.

$$0.59\lambda 1/(n-1) < d1 < 0.63\lambda 1/(n-1) \quad (1I')$$

More specifically, for example, there are given a structure which is shown in FIG. 10 and in the following Table 3. The structure is a five-level blaze-type step structure that generates the plus-first-order diffracted light with the maximum amount for $\lambda 1$, the minus-second-order diffracted light with the maximum amount for $\lambda 2$ and the minus-second-order diffracted light with the maximum amount for $\lambda 3$, where $\lambda 1$ is 0.405 μm, n is 1.605367 and d1 is 0.42 μm. Namely, d1 is $0.62\lambda/(n-1)$. However, an optical path difference given by the step difference is not $0.62\lambda 1$ but is $0.77\lambda 1$, because of the inclination of 0.1 μm per one small step difference. Since the conditional expression (1I') is satisfied and diffraction efficiencies are adjusted by inclining the terrace surfaces, it is possible to obtain diffraction efficiencies of 50% or more for all of the first light flux, the second light flux and the third light flux as shown in Table 3. In other words, high diffraction efficiencies can be maintained for all of the first light flux, the second light flux and the third light flux.

TABLE 3

Provided is a structure given by changing inclination of steps without changing the height of one step based on Example 1
5-level
Height of one step: d1 = 0.42 μm
Inclination of one step: 0.1 μm

|  | BD | DVD | CD |
| --- | --- | --- | --- |
| Wavelength | $\lambda 1 = 405$ nm | $\lambda 2 = 655$ nm | $\lambda 3 = 785$ nm |
| Refractive index | 1.605367 | 1.586000 | 1.581901 |
| Diffraction order number | +1 | −2 | −2 |
| Optional path difference caused by height of one step and inclination | $0.77\lambda 1$ | $0.46\lambda 2$ | $0.38\lambda 3$ |
| Diffraction efficiency | 62% | 53% | 68% |

Further, FIG. 11a is a graph that shows how diffraction efficiencies for the first-order diffracted light for $\lambda d$, the minus-second-order diffracted light for $\lambda 2$ and the minus-second-order diffracted light for $\lambda 3$ are fluctuated, when an optical path difference generated by one small step difference is changed, which is obtained by changing step-difference amount d1 in the optical axis direction of a small step difference, while keeping the five-level blaze-type step structure, in the first basic structure, based on the example shown in FIG. 10. This graph shows that 50% or more diffraction efficiencies can be maintained for the first light flux and the third light flux when an optical path difference is within a range of about $0.59\lambda 1$-$0.71\lambda 1$, and that 50% or more diffraction efficiencies can be maintained for the first light flux, the second light flux and the third light flux when an optical path difference is within a range of about $0.59\lambda 1$-$0.63\lambda 1$.

Describing the aforesaid conditional expressions (1H)-(1I') more accurately, FIG. 11b is a graph that shows how diffraction efficiencies for the first-order diffracted light for $\lambda 1$, the minus-first-order diffracted light for $\lambda 2$ and the minus-first-order diffracted light for $\lambda 3$ are fluctuated, when an optical path difference generated by one small step difference is changed, in view of a step difference obtained by both of inclination and step difference in one small step difference of the step unit of the present example. As is understood from this graph, it is preferable that the optical path difference is greater than $0.7\lambda 1$ and is smaller than $0.9\lambda 1$. It is more preferable that the optical path difference that is given is greater than $0.74\lambda 1$ and is smaller than $0.86\lambda 1$. By satisfying this condition, it is possible to obtain diffraction efficiencies of 50% or more for the first light flux and the third light flux, which is preferable. It is more preferable that the optical path difference to be given is larger than $0.74\lambda 1$ and is smaller than $0.78\lambda 1$, from the viewpoint to obtain diffraction efficiencies of 50% or higher for all of the first light flux, the second light flux and the third light flux.

Next, an example to obtain a first optical path difference providing structure by overlapping the first basic structure and the second basic structure together, will be described in detail. When the objective lens is used for all of the first light flux, the second light flux and the third light flux, there is preferably provided the first optical path difference providing structure in which the first basic structure and the second basic structure are overlapped together. In this structure, it is preferable that the first basic structure is configured to realize compatibility between the first optical disc and the third optical disc, and that the second basic structure is configured to realize compatibility between the first optical disc and the second optical disc. Accordingly, it is preferable that the second basic structure corrects the first light flux and the second light flux which pass through the second basic structure in terms of spherical aberration that is caused by a difference between thickness t1 of a protective substrate of the first optical disc and thickness t2 of a protective substrate of the second optical disc and/or spherical aberration that is caused by a difference between a wavelength of the first light flux and a wavelength of the second light flux.

Incidentally, an embodiment that a first optical path difference providing structure composed of only a first basic structure is provided on an optical surface of the objective lens, and that a fourth optical path difference providing structure including the second basic structure is provided on another optical surface of the objective lens is not denied.

Before the structure formed after the overlapping process is explained, the second basic structure will be explained first. Either one of a blaze structure and a step structure can be used as the second basic structure. An example of the structure that is more specific and preferable for the second basic structure will be shown.

(First Example of the Second Basic Structure)

In the present example, $|L|=2$, $|M|=1$ and hold, under the assumption that L-th diffracted light flux has the maximum diffracted light amount among the diffracted light fluxes generated when the first light flux enters the second basic structure, M-th diffracted light flux has the maximum diffracted-light amount among the diffracted light fluxes generated when the second light flux enters the second basic structure, and N-th diffracted light flux has the maximum diffracted-light amount among the diffracted light fluxes generated when the third light flux enters the second basic structure. In the above expressions, all of L, M and N have the same positive or negative sign. It is preferable that L is +2, M is +1, and N is +1.

The second basic structure in the present example has a blaze structure. Further, it is preferable that the step-difference amount d2 in the optical axis direction of the second basic structure representing a blaze structure satisfies the following conditional expression.

$$1.5\lambda1/(n-1)<d2<2.4\lambda1/(n-1) \quad (1J)$$

It is more preferable that the following conditional expression is satisfied.

$$1.9\lambda1/(n-1)<d2<2.1\lambda1/(n-1) \quad (1J')$$

More specifically, for example, there is given a structure which are shown in FIG. 12 and in the following Table 4. The structure is a blaze structure that generates the plus-second-order diffracted light with the maximum amount for $\lambda1$, the plus-first-order diffracted light with the maximum amount for $\lambda2$ and the plus-first-order diffracted light with the maximum amount for $\lambda3$, where $\lambda1$ is 0.405 μm, n is 1.605367 and d2 representing a step-difference amount in the optical axis direction of the blaze structure is 134 μm. In other words, d2 is $2\lambda1/(n-1)$. Therefore, the conditional expression (1J) is satisfied.

TABLE 4

Height of blaze: d2 = 1.34 μm

| | BD | DVD | CD |
|---|---|---|---|
| Wavelength | $\lambda1$ = 405 nm | $\lambda2$ = 655 nm | $\lambda3$ = 785 nm |
| Refractive index | 1.605367 | 1.586000 | 1.581901 |
| Diffraction order number | +2 | +1 | +1 |
| Optical path difference by a height of blaze | $2.0\lambda1$ | $1.2\lambda2$ | $1.0\lambda3$ |
| Diffraction efficiency | 100% | 88% | 100% |

(Second Example of the Second Basic Structure)

In the present example, |L|=0, |M|=1 and |N|=0 hold, under the assumption that L-th diffracted light flux has the maximum diffracted-light amount among the diffracted light fluxes generated when the first light flux enters the second basic structure, M-th diffracted light flux has the maximum diffracted-light amount among the diffracted light fluxes generated when the second light flux enters the second basic structure, and N-th diffracted light flux has the maximum diffracted-light amount among the diffracted light fluxes generated when the third light flux enters the second basic structure. It is preferable that M is +1.

The second basic structure in the present example has a five-level step structure in which terrace surfaces are parallel with a base surface. It is further preferable that the following conditional expression is satisfied by the step-difference amount d2 in the optical axis direction of a small step-difference of the step structure.

$$1.5\lambda1/(n-1)<d2<2.4\lambda1/(n-1) \quad (1K)$$

It is more preferable that the following conditional expression is satisfied.

$$1.9\lambda1/(n-1)<d2<2.1\lambda1/(n-1) \quad (1K')$$

More specifically, for example, there are given a structure which is shown in FIG. 13 and in the following Table 5. The structure is a five-level step structure that generates the zero-th-order diffracted light with the maximum amount for $\lambda1$, the plus-first-order diffracted light with the maximum amount for $\lambda2$ and the zero-th-order diffracted light with the maximum amount for $\lambda3$, where $\lambda1$ is 0.405 μm, n is 1.605367 and d1 is 034 μm. Namely, $d2=2\lambda1/(n-1)$ holds.

TABLE 5

Height of one step: d2 = 1.34 μm
Inclination of one step: 0 μm

| | BD | DVD | CD |
|---|---|---|---|
| Wavelength | $\lambda1$ = 405 nm | $\lambda2$ = 655 nm | $\lambda3$ = 785 nm |
| Refractive index | 1.605367 | 1.586000 | 1.581901 |
| Diffraction order number | 0 | +1 | 0 |
| Optical path difference by a height of one step | $2.0\lambda1$ | $1.2\lambda2$ | $1.0\lambda3$ |
| Diffraction efficiency | 100% | 88% | 100% |

(Third Example of the Second Basic Structure)

In the present example, |L|=2, |M|=2 and |N|=1 hold, under the assumption that L-th diffracted light flux has the maximum diffracted-light amount among the diffracted light fluxes generated when the first light flux enters the second basic structure, M-th diffracted light flux has the maximum diffracted-light amount among the diffracted light fluxes generated when the second light flux enters the second basic structure, and N-th diffracted light flux has the maximum diffracted-light amount among the diffracted light fluxes generated when the third light flux enters the second basic structure. In the above expressions, all of L, M and N have the same positive or negative sign. It is preferable that L is +2, M is +2, and N is +1.

The second basic structure in the present example has a four-level blaze-type step structure. It is preferable that the step-difference amount d2 in the optical axis direction of a small step difference of the blaze-type step structure satisfies the following conditional expression.

$$1.5\lambda1/(n-1)<d2<2.5\lambda1/(n-1) \quad (1L)$$

It is more preferable that the following conditional expression is satisfied.

$$1.7\lambda1/(n-1)<d2<2.3\lambda1/(n-1) \quad (1L')$$

Further, with respect to the second basic structure in the present example, it is preferable that the step-difference amount in the optical axis direction of a large step difference of the blaze-type step structure formed after the overlapping process satisfies the following conditional expression.

$$7.0\lambda1/(n-1)<d21<8.0\lambda1/(n-1) \quad (1M)$$

It is more preferable that the following conditional expression is satisfied.

$$7.3\lambda1/(n-1)<d21<7.7\lambda1/(n-1) \quad (1M')$$

More specifically, for example, there is given a structure which are shown in FIG. 14 and in the following Table 6. The structure is a four-level blaze-type step structure whose step-difference amount in the optical axis direction of a small step difference is 1.34 μm and whose inclination amount of per one step is 0.33 μm, and it generates the plus-second-order diffracted light with the maximum amount for $\lambda1$, the plus-second-order diffracted light with the maximum amount for $\lambda2$ and the plus-first-order diffracted light with the maximum amount for $\lambda3$, where $\lambda1$ is 0.405 μm, n is 1.605367, d2 is 1.34 and d21 is 5.34 μm. From the foregoing, $d2=2\lambda1/(n-1)$ holds.

However, an optical path difference given by the step difference is not 2λ1 but is 2.5λ1, because the terrace surfaces are inclined.

TABLE 6

Height of one step: d2 = 1.34 μm
Inclination of one step: 0.33 μm

|  | BD | DVD | CD |
|---|---|---|---|
| Wavelength | λ1 = 405 nm | λ2 = 655 nm | λ3 = 785 nm |
| Refractive index | 1.605367 | 1.586000 | 1.581901 |
| Diffraction order number | +2 | +2 | +1 |
| Optional path difference caused by height and inclination of one step | 2.5λ1 | 1.5λ2 | 1.25λ3 |
| Diffraction efficiency | 100% | 87% | 100% |

Describing the aforesaid conditional expressions (1L)–(1L') more accurately, when a step difference obtained by both of inclination and step difference in one small step difference of the step unit of the present example, it is preferable that the optical path difference is greater than 2.0λ1 and is smaller than 3.0λ1. It is more preferable that the optical path difference that is given is greater than 2.2 λ1 and is smaller than 2.7λ1.

Next, overlapping of the first basic structure and the second basic structure will be explained. Under the condition that the first basic structure and the second basic structure are overlapped together and that the second basic structure is a blaze structure, it is preferable, from the view point of easy manufacturing, that positions of all the step difference sections of the second basic structure agree with the positions of the step difference sections of the first basic structure, because the shape of the first optical path difference providing structure can be simplified. When the positions of step difference sections of plural basic structures agree with together as described above, it is expressed by saying that "repetition cycles agree with each other". In this case, the first optical path difference providing structure is a blaze-type step structure. As an example, there will be shown an example wherein overlapping is carried out such that positions P1 that are deepest in the blaze structure shown in FIG. 3a and positions P2 that are deepest in the step structure shown in FIG. 3b agree with each other in terms of a position. This is an example of an overlapping process in which overlapping is carried out such that positions of all step differences sections of the second basic structure representing a blaze structure and positions of step difference sections of the first basic structure representing a step structure agree with each other. Owing to this, the first optical path difference providing structure shown in FIG. 3c can be obtained. In this way, it is possible to obtain a blaze-type step structure shown in FIG. 3c, by overlapping the blaze structure and the step structure so that positions of step differences of the blaze structure and positions of large step differences of the step structure agree with each other.

On the other hand, under the condition that the first basic structure and the second basic structure are overlapped together and the second basic structure is also a step structure, namely, step structures are overlapped together, it is preferable that the step structure of the first basic structure and the step structure of the second basic structure are overlapped such that positions of all the large step differences of the second basic structure and positions of large step differences of the first basic structure agree with each other, or are overlapped such that positions of the large step differences of the second basic structure and positions of all the large step differences of the first basic structure agree with each other. Preferably, positions P2 in FIG. 3b of both structures are overlapped together, which is also called to be the expression of "repetition cycles agree with each other". Further, the overlapping may be carried out such that plural units of ring-shaped surfaces of the second basic structure correspond to one unit of ring-shaped surfaces of the first basic structure.

Incidentally, when overlapping the first basic structure and the second basic structure together, it is possible to overlap either in the way so that directions of the first and second basic structures may be the same or in the way so that directions of the first and second basic structures may be different from each other.

When the first basic structure and the second basic structure as a blaze structure are overlapped together with the repetition cycles which agree with each other, to obtain the first optical path difference providing structure, the first optical path difference providing structure becomes a blaze-type step structure and step-difference amount d0 in the optical axis direction of a small step difference of a step unit of the blaze-type step structure preferably satisfies the following conditional expression, where n is a refractive index of the objective lens for the first light flux.

$$0.5\lambda1/(n-1)<d0<\lambda1/(n-1) \tag{10}$$

The reason why satisfying of the conditional expression (10) by the first optical path difference providing structure is preferable is the same as the reason why satisfying of the conditional expression (1) by the aforesaid first basic structure is preferable.

Incidentally, when the first wavelength is around 0.405 μm and the third wavelength is around 0.785 μm, the following expression (10') is preferably satisfied in order to make the diffraction order number of the diffracted light with wavelength λ1 and the diffraction order number of the diffracted light with wavelength λ3 to be in relationship of the different signs.

$$0.5\lambda1/(n-1)<d0<0.97\lambda1/(n-1) \tag{10'}$$

It is more preferable if step-difference amount in the optical axis direction d0 satisfies the following conditional expression.

$$0.5\lambda1/(n-1)<d0<0.9\lambda1/(n-1) \tag{10A}$$

It is more preferable if step-difference amount in the optical axis direction d0 satisfies the following conditional expression.

$$0.55\lambda1/(n-1)<d0<0.89\lambda1/(n-1) \tag{10B}$$

When the aforesaid expression (10B) is satisfied, the diffraction efficiency of 50% or more is obtained for each of the first and third light fluxes, which is preferable.

It is more preferable if step-difference amount in the optical axis direction d0 satisfies the following conditional expression.

$$0.56\lambda1/(n-1)<d0<0.84\lambda1/(n-1) \tag{10B'}$$

It is more preferable if step-difference amount in the optical axis direction d0 satisfies the following conditional expression.

$$0.55\lambda1/(n-1)<d0<0.79\lambda1/(n-1) \tag{10C}$$

When the aforesaid expression (10C) is satisfied, the diffraction efficiency of 50% or more is obtained for each of the first, second and third light fluxes, which is preferable.

It is more preferable if step-difference amount in the optical axis direction d1 satisfies the following conditional expression.

$$0.56\lambda1/(n-1)<d1<0.74\lambda1/(n-1) \quad (10C')$$

On the other hand, the way of overlapping of the first basic structure and the second basic structure is not limited, if simplicity in the form is not stuck to. A step structure of the first basic structure and a blaze structure of the second basic structure, or a step structure of the first basic structure and a step structure of the second basic structure, may be overlapped so that their repetition cycles may agree with each other in only a part of the structures, or so that their repetition cycles do not agree at all. For example, when the second basic structure is a blaze structure, a step structure of the fast basic structure and a blaze structure of the second basic structure may be overlapped so that a position of at least one step difference section of the second basic structure may not agree with any positions of step differences section of the first basic structure. They may be overlapped so that positions of 50% or more of step difference sections in the second basic structure may not agree with positions of step difference sections of the first basic structure. Further, they may be overlapped so that positions of all the step difference sections of the second basic structure may not agree with positions of step difference sections of the first basic structure.

Further, when the second basic structure is a step structure, a step structure of the first basic structure and a step structure of the second basic structure may be overlapped so that a position of at least one large step difference of the second basic structure may not agree with any positions of large step differences of the first basic structure. They may also be overlapped so that positions of 50% or more of large step differences in the second basic structure may not agree with positions of large step differences of the first basic structure. Furthermore, they may be overlapped so that the positions of all the large step differences of the second basic structure may not agree with positions of large step differences of the first basic structure.

Next, there will be shown some preferable examples of the first optical path difference providing structure obtained by overlapping the first basic structure and the second basic structure so that repetition cycles may agree with each other.

Example 1

As an example of the preferable first optical path difference providing structure, there is given a following combination of the first basic structure and the second basic structure. The first basic structure is provided as a five-level step structure, and the plus-first order diffracted light flux has the maximum diffracted-light amount among diffracted light fluxes generated when the first light flux enters the first basic structure, the minus-second order diffracted light flux has the maximum diffracted-light amount among diffracted light fluxes generated when the second light flux enters the first basic structure, and the minus-second order diffracted light flux has the maximum diffracted-light amount among diffracted light fluxes generated when the third light flux enters the first basic structure. Then, the second basic structure is provided as a blaze structure, and the plus-second order diffracted light flux has the maximum diffracted-light amount among diffracted light fluxes generated when the first light flux enters the second basic structure, the plus-first order diffracted light flux has the maximum diffracted-light amount among diffracted light fluxes generated when the second light flux enters the second basic structure, and the plus-first order diffracted light flux has the maximum diffracted-light amount among diffracted light fluxes generated when the third light flux enters the second basic structure.

The first optical path difference providing structure obtained by overlapping the first basic structure and the second basic structure together so that repetition cycles agree with each other becomes a blaze-type step structure.

In this blaze-type step structure, it is preferable that step-difference amount d0 in the optical axis direction of a small step differ ice and step-difference amount d00 in the optical axis direction of a large step difference satisfy the following conditional expressions, in a part in which pitches of the first and second basic structures are made to agree with each other and they are overlapped together so as to face the same direction.

$$0.7\lambda1/(n-1)<d0<0.9\lambda1/(n-1) \quad (10M)$$

$$4.3\lambda1/(n-1)<d00<6.0\lambda1/(n-1) \quad (10N)$$

When the aforesaid conditions are satisfied, high diffraction efficiencies can be obtained for the first light flux and the third light flux, which is preferable.

It is more preferable that the following conditional expressions are satisfied.

$$0.72\lambda1/(n-1)<d0<0.88\lambda1/(n-1 \quad (10M')$$

$$4.32\lambda1/(n-1)<d00<5.92\lambda1/(n-1) \quad (10N')$$

Further, from the viewpoint to obtain high diffraction efficiencies for all of the first, second and third light fluxes, it is preferable to satisfy the following conditional expressions.

$$0.7\lambda1/(n-1)<d0<0.75\lambda1/(n-1) \quad (10M'')$$

$$4.3\lambda1/(n-1)<d00<5.4\lambda1/(n-1) \quad (10N'')$$

It is more preferable that the following conditional expressions are satisfied.

$$0.72\lambda1/(n-1)<d0<0.74\lambda1/(n-1) \quad (10M''')$$

$$4.38\lambda1/(n-1)<d00<5.36\lambda1/(n-1) \quad (10N''')$$

On the other hand, in the blaze-type step structure, it is preferable that step-difference amount d00 in the optical axis direction of a large step difference satisfies the following conditional expression, in a part in which pitches of the first and second basic structures are made to agree with each other and they are overlapped together so as to face the different directions. The step-difference amount in the optical axis direction of small step difference is the same as that explained above.

$$0.4\lambda1/(n-1)<d00<2.1\lambda1/(n-1) \quad (10N)$$

When the aforesaid condition is satisfied, high diffraction efficiencies can be obtained, which is preferable.

It is more preferable that the following conditional expression is satisfied.

$$0.48\lambda1/(n-1)<d00<2.02\lambda1/(n-1) \quad (10N')$$

Further, from the viewpoint to obtain high diffraction efficiency for all of the first, second and third light fluxes, it is preferable to satisfy the following conditional expression.

$$0.4\lambda1/(n-1)<d00<1.5\lambda1/(n-1) \quad (10N'')$$

It is more preferable that the following conditional expression is satisfied.

$$0.48\lambda1/(n-1)<d00<1.46\lambda1/(n-1) \quad (10N''')$$

FIG. 15 shows an example that the first basic structure and the second basic structure of the present example are overlapped together, their repetition cycles does not agree, and that a position of at least one step difference of the second basic structure does not agree with any positions of large step differences of the first basic structure. In the exampled shown in FIG. 15, there exists a portion where a height of a step structure is high or a portion where one step has a narrowed width. Further, FIG. 16 shows an example that positions of all the step differences of the second basic structure agree with positions of large step differences in the first basic structure in the example of FIG. 15. In the example shown in FIG. 16, the portion where a height of a step structure is high or the portion where one step has a narrowed width are eliminated, and becomes a structure which is more advantageous in terms of manufacturing, in comparison with the example of FIG. 15. The examples of FIGS. 15 and 16 are examples that a blaze structure and a step structure are overlapped together so as to face the different directions from each other.

The first optical path difference providing structure shown in this Example 1 realizes a compatibility of three optical discs including the first, second and third optical discs, and can maintain the diffraction efficiencies to be well-balanced and to be high for all the optical discs.

Example 2

As another preferable example of the first optical path difference providing structure, there is given a combination of the first basic structure and the second basic structure described below. In this example, the first basic structure is provided as a three-level step structure, the plus-first diffracted light flux has the maximum diffracted-light amount among diffracted light fluxes generated when the first light flux enters the first basic structure, the minus-first diffracted light flux has the maximum diffracted-light amount among diffracted light fluxes generated when the second light flux enters the first basic structure, and the minus-first diffracted light flux has the maximum diffracted-light amount among diffracted light fluxes generated when the third light flux enters the first basic structure. Further, the second basic structure is provided as a blaze structure, the plus-second diffracted light flux has the maximum diffracted-light amount among diffracted light fluxes generated when the first light flux enters the second basic structure, the plus-first diffracted light flux has the maximum diffracted-light amount among diffracted light fluxes generated when the second light flux enters the second basic structure, and the plus-first diffracted light flux has the maximum diffracted-light amount among diffracted light fluxes generated when the third light flux enters the second basic structure.

The first optical path difference providing structure obtained by overlapping the first basic structure and the second basic structure together such that their repetition cycles agree with each other, turns out to be a blaze-type step structure.

In this blaze-type step structure, it is preferable that step-difference amount d0 in the optical axis direction of a small step difference and step-difference amount d00 in the optical axis direction of a large step difference satisfy the following conditional expressions, in a part in which pitches of the first and second basic structures are made to agree with each other and they are overlapped together so as to face the same direction.

$$0.5\lambda 1/(n-1) < d0 < 0.8\lambda 1/(n-1) \tag{10P}$$

$$2.5\lambda 1/(n-1) < d00 < 4.0\lambda 1/(n-1) \tag{10Q}$$

When the aforesaid conditions are satisfied, high diffraction efficiencies can be obtained for the first light flux and the third light flux, which is preferable.

It is more preferable that the following conditional expressions are satisfied.

$$0.56\lambda 1/(n-1) < d0 < 0.77\lambda 1/(n-1) \tag{10P'}$$

$$2.62\lambda 1/(n-1) < d00 < 3.94\lambda 1/(n-1) \tag{10Q'}$$

Further, from the viewpoint to obtain high diffraction efficiencies for all of the first, second and third light fluxes, it is preferable to satisfy the following conditional expressions.

$$0.5\lambda 1/(n-1) < d0 < 0.75\lambda 1/(n-1) \tag{10P''}$$

$$2.5\lambda 1/(n-1) < d00 < 3.9\lambda 1/(n-1) \tag{10Q''}$$

It is more preferable that the following conditional expressions are satisfied.

$$0.72\lambda 1/(n-1) < d0 < 0.74\lambda 1/(n-1) \tag{10P'''}$$

$$2.62\lambda 1/(n-1) < d00 < 3.88\lambda 1/(n-1) \tag{10Q'''}$$

On the other hand, in the blaze-type step structure, it is preferable that step-difference amount d00 in the optical axis direction of a large step difference satisfies the following conditional expression, in a part in which pitches of the first and second basic structures are made to agree with each other and they are overlapped together so as to face the different directions. The step-difference amount in the optical axis direction of small step difference is the same as that explained above.

$$0 \cdot \lambda 1/(n-1) < d00 < 1.4\lambda 1/(n-1) \tag{10Q}$$

When the aforesaid condition is satisfied, high diffraction efficiencies can be obtained, which is preferable.

It is more preferable that the following conditional expression is satisfied.

$$0.04\lambda 1/(n-1) < d00 < 1.28\lambda 1(n-1) \tag{10Q'}$$

Further, from the viewpoint to obtain high diffraction efficiencies for all of the first, second and third light fluxes, it is preferable to satisfy the following conditional expression.

$$0 \cdot \lambda 1/(n-1) < d00 < 1.4\lambda 1/(n-1) \tag{10Q''}$$

More preferable is to satisfy the following conditional expression.

$$0.02\lambda 1/(n-1) < d00 < 0.96\lambda 1/(n-1) \tag{10Q'''}$$

FIG. 17 shows an example that the fast basic structure and the second basic structure of the present example are overlapped together, their repetition cycles does not agree, and a position of at least one step difference of the second basic structure does not agree with any positions of large step differences of the first basic structure. In the exampled shown in FIG. 17, there exists a portion where a height of a step structure is high or a portion where one step has a narrowed width. Further, FIG. 18 shows an example that positions of all the step differences of the second basic structure agree with positions of large step differences in the first basic structure in the example of FIG. 17. In the example shown in FIG. 18, the portion where a height of a step structure is high or the portion where one step has a narrowed width are eliminated, and becomes a structure which is more advantageous in terms of manufacturing, in comparison with the example of FIG. 17. The examples of FIGS. 17 and 18 are examples including both of a portion where a blaze structure and a step structure are overlapped together so as to face the different directions from each other and a portion where they are overlapped together so as to face the same direction.

The first optical path difference providing structure shown in this example 2 also realizes a compatibility of the first, second and third optical discs, and can maintain the diffraction efficiencies to be well-balanced and to be high for all optical discs.

Further, when a second optical path difference providing structure is arranged in a peripheral area of the objective lens, additionally to the first optical path difference providing structure arranged in the central area of the objective lens, they can be arranged on the different optical surfaces but they are preferably arranged on the same optical surface. By arranging them on the same optical surface, decentration error caused in a manufacturing process can be reduced, which is preferable. The first optical path difference providing structure and the second optical path difference providing structure are preferably arranged on the surface of the objective lens facing the light source rather than the surface of the objective lens facing the optical disc.

When the objective lens is configured to be applied to an optical pickup apparatus including only the first light source and the third light source, the objective lens converge the first light flux and third light flux which have passed through the central area in the objective lens where the first optical path difference providing structure is formed, to form respective converged spots. Preferably, the objective lens converge the first light flux which has passed through the central area in the objective lens where the first optical path difference providing structure is formed, so as to be capable of recording and reproducing of information on an information recording surface of the first optical disc. The objective lens converge the third light flux which has passed through the central area in the objective lens where the first optical path difference providing structure is formed, so as to be capable of recording and reproducing of information on an information recording surface of the third optical disc. Further, the first optical path difference providing structure preferably corrects the first light flux and the third light flux which have passed through the first optical path difference providing structure in terms of spherical aberration generated from a difference between thickness t1 of the protective substrate of the first optical disc and thickness t3 of the protective substrate of the second optical disc and/or spherical aberration generated from a difference in wavelength between the first light flux and the third light flux.

On the other hand, when the objective lens is configured to be applied to an optical pickup apparatus including the second light source additionally to the first light source and the third light source, the objective lens converge the first light flux, the second light flux and third light flux which have passed through the central area in the objective lens where the first optical path difference providing structure is formed, to form respective converged spots. Preferably, the objective lens converge the first light flux which has passed through the central area in the objective lens where the first optical path difference providing structure is formed, so as to be capable of recording and reproducing of information on an information recording surface of the first optical disc. Further, the objective lens converge the second light flux which has passed through the central area in the objective lens where the first optical path difference providing structure is formed, so as to be capable of recording and reproducing of information on an information recording surface of the second optical disc. Moreover, the objective lens converge the third light flux which has passed through the central area in the objective lens where the first optical path difference providing structure is formed, so as to be capable of recording and reproducing of information on an information recording surface of the third optical disc. When thickness t1 of a protective substrate of the first optical disc is different from thickness t2 of a protective substrate of the second optical disc, it is preferable that the first optical path difference providing structure corrects the first light flux and the second light flux which have passed through the first optical path difference providing structure in terms of spherical aberration generated from a difference between thickness t1 of the protective substrate of the that optical disc and thickness t2 of the protective substrate of the second optical disc and/or spherical aberration generated from a difference in wavelength between the first light flux and the second light flux. Further, it is preferable that the first optical path difference providing structure corrects the first light flux and the third light flux which have passed through the first optical path difference providing structure in terms of spherical aberration generated from a difference between thickness t1 of the protective substrate of the first optical disc and thickness t3 of the protective substrate of the third optical disc and/or spherical aberration generated from a difference in wavelength between the first light flux and the third light flux.

When the objective lens is configured to be applied to an optical pickup apparatus including only the first light source and the third light source, the objective lens converge the first light flux which has passed through the peripheral area to form a converged spot. Preferably, the objective lens converge the first light flux which has passed through the peripheral area of the objective lens so as to be capable of recording and reproducing of information on an information recording surface of the first optical disc. It is preferable that the third light flux which has passed through the peripheral area of the objective lens is not used for recording and reproducing of information on an information recording surface of the third optical disc. It is preferable that the third light flux which has passed through the peripheral area does not contribute toward forming a converged spot on the information recording surface of the third optical disc. Namely, it is preferable that the third light flux which has passed through the peripheral area forms flare light on the information recording surface of the third optical disc. The flare light will be described later.

On the other hand, when the objective lens is configured to be applied to an optical pickup apparatus including the second light source additionally to the first light source and the third light source, and when the second optical path difference providing structure is formed on the objective lens, the first light flux and the second light flux are converged to form respective converged spots by using the second optical path difference providing structure. Preferably, the objective lens converge the first light flux which has passed through the peripheral area of the objective lens where the second optical path difference providing structure is formed, so as to be capable of recording and reproducing of information on an information recording surface of the first optical disc. Further, when the second optical path difference providing structure is formed on the objective lens, the second light flux is converged to form a converged spot by using the second optical path difference providing structure. The second optical path difference providing structure preferably corrects chromatic aberration generated by a difference in wavelength between the first light flux and the second light flux which have passed through the second optical path difference providing structure.

As a preferred embodiment, there is cited an embodiment that the third light flux which has passed through the peripheral area is not used for recording and/or reproducing information for the third optical disc. It is preferable that the third light flux which has passed through the peripheral area does not contribute toward forming a converged spot on the information recording surface of the third optical disc. In other words, when the second optical path difference providing structure is arranged on the objective lens, thereby, the third light flux which has passed through the peripheral area is preferably formed into flare light on the information recording surface of the third optical disc. As shown in FIG. 4, in a spot formed on an information recording surface of the third optical disc by the third light flux which has passed through the objective lens, there are preferably provided, in order from the optical-axis side (or from the central portion of the spot), central spot portion SCN with the largest density of a light amount, intermediate spot portion SMD with a density of a light amount being smaller than that of the central spot portion, and peripheral spot portion SOT with a density of a light amount being larger than that of the intermediate spot portion and being smaller than that of the central spot portion. The central spot portion is used for recording and/or reproducing information on an optical disc, and the intermediate spot portion and the peripheral spot portion are not used for recording and/or reproducing information on an optical disc. In the above descriptions, the peripheral spot portion is described as flare light. Alternatively, in a type that the peripheral spot portion exists around the central spot portion without the existence of the intermediate spot portion, namely, in the case that a spot which is weak and extends largely is formed around the central spot portion, such the peripheral spot area is called as flare light. In other words, the third light flux which has passed through the second optical path difference providing structure forms a peripheral spot portion on an information recording surface of the third disc.

It is preferable that the second optical path difference providing structure satisfies the following three conditions. 1) A big difference is not generated in temperature characteristics and in wavelength characteristics between the first optical path difference providing structure and the second optical path difference providing structure; 2) Diffraction efficiency of the first light flux is requested to be enhanced for raising light utilization efficiency of the first light flux; and 3) The third light flux which has passed through the second optical path difference providing structure turns out to be flare light in comparison with the third light flux that has passed through the fast optical path difference providing structure. To be concrete, the following structure is given as a preferable item.
(First Example of the Second Optical Path Difference Providing Structure)

In the present example, |L|=1 and |M|=1 hold, under the assumption that L-th diffracted light flux has the maximum diffracted-light amount among the diffracted light fluxes, generated when the first light flux enters the second optical path difference providing structure, and M-th diffracted light flux has the maximum diffracted-light amount among the diffracted light fluxes generated when the second light flux enters the second optical path difference providing structure. Herein, L has a different positive or negative sign from that of M. It is preferable that L is +1 and M is −1. Its shape is preferably a five-level step structure.
(Second Example of the Second Optical Path Difference Providing Structure)

In the present example, |L|=2 and |M|=0 hold, under the assumption that L-th diffracted light flux has the maximum diffracted-light amount among the diffracted light fluxes generated when the first light flux enters the second optical path difference providing structure, and M-th diffracted light flux has the maximum diffracted-light amount among the diffracted light fluxes generated when the second light flux enters the second optical path difference providing structure. It is preferable that L is +2. Its shape is preferably a four-level step structure.

When the objective lens is configured to be applied to an optical pickup apparatus including the second light source additionally to the first light source and the third light source, the objective lens preferably includes the most peripheral area. As a preferable embodiment that there exists the most peripheral area, there is cited an embodiment that the first light flux which has passed through the most peripheral area is used for recording and/or reproducing information on the first optical disc, the second light flux and the third light flux which have passed through the most peripheral area are not used far recording and/or reproducing information on the second optical disc and the third optical disc, respectively. It is preferable that each of the second light flux and the third light flux which have passed through the most peripheral area do not contribute toward forming a converged spot on a corresponding information recording surface of the second optical disc or the third optical disc. Namely, when the objective lens includes the most peripheral area, it is preferable that each of the second light flux and the third light flux which have passed through the most peripheral area forms flare light on a corresponding information recording surface of the second optical disc or the third optical disc. In other words, it is preferable that each of the second light flux and the third light flux which have passed through the most peripheral area forms a peripheral spot portion on a corresponding information recording surface of the second optical disc or the third optical disc.

When the most peripheral area includes a third optical path difference providing structure, the third optical path difference providing structure may correct the first light flux which has passed through the third optical path difference providing structure in terms of a spherochromatism (chromatic spherical aberration) caused due to the slightly fluctuating wavelength of the first light source. The slight fluctuation of the wavelength means the fluctuation within ±10 nm. For example, when the first light flux changes by ±5 nm from the wavelength it is preferable that the third optical path difference providing structure corrects the fluctuation of the spherical aberration of the first light flux which has passed through the most peripheral area and the amount of the fluctuation of the spherical aberration on the information recording surface of the first optical disc is 0.001λ2 rms or more, and is 0.070λ2 rms or less.

Incidentally, when the first optical path difference providing structure is formed by overlapping the first basic structure and the second basic structure together, it is possible to make directions of outgoing beams different for all of the first, second and third light fluxes having passed through the first optical path difference providing structure. Therefore, even when all of the first, second and third light fluxes enter the objective lens under the same image-forming magnification (for example, all of them enter the objective lens as parallel light fluxes), it is possible to correct aberrations generated because of using different types of optical discs, which realizes the compatibility.

When the objective lens is a plastic lens, the first optical path difference providing structure may be formed by further overlapping the third basic structure as a structure for correcting temperature characteristics with the first basic structure or the first and second basic structures. Specifically, it is preferable that a step-difference amount in the optical axis direction of the third basic structure is a step-difference amount so as to give an optical path difference equivalent to about 10 wavelengths of the first wavelength to the first light flux, give an optical path difference equivalent to about 6 wavelengths of the second wavelength to the second light flux, and give an optical path difference equivalent to about 5 wavelengths of the third wavelength to the third light flux, or is a step-difference amount so as to give an optical path difference equivalent to about 2 wavelengths of the first wavelength to the first light flux, give an optical path difference equivalent to about one wavelength of the second wavelength to the second light flux, and give an optical path difference equivalent to about one wavelength of the third wavelength to the third light flux.

As stated above, it is preferable that a step-difference amount is not too large. When a step difference-amount of a certain ring-shaped zone in a basic optical path providing structure obtained by overlapping plural basic structures together is higher than a standard value, it is possible to reduce the step-difference amount that is too large without affecting optical efficiencies, by lowering the step-difference amount of the ring-shaped zone by $10\cdot\lambda 1/(n-1)$ (μm). Incidentally, it is possible to establish an arbitral value as a standard value, but it is preferable to establish a standard value of $10\cdot\lambda 1/(n-1)$ (μm).

Further, from the viewpoint that long and slender ring-shaped zones in less quantity are desirable for a manufacturing process, it is preferable that a value of "step-difference amount"/"level width" is 1 or less in all ring-shaped zones in the first optical path difference providing structure, and aforesaid value of 0.8 or less is more preferable. It is more preferable that a value of "step-difference amount"/"level width" is 1 or less for all ring-shaped zones in all optical path difference providing structures, and the value of 0.8 or less is more preferable.

The image-side numerical aperture of the objective lens, necessary for reproducing and/or recording information for the first optical disc, is defined as NA1. The image-side numerical aperture of the objective lens, necessary for reproducing and/or recording for the information to the second optical disc, is defined as NA2(NA1≧NA2). The image side numerical aperture of the objective lens, necessary for reproducing and/or recording information for the third optical disc is defined as NA3 (NA2>NA3). NA1 is preferably 0.6 or more, and 0.9 or less, and is more preferably from 0.8 or more, and 0.9 or less. It is especially preferably NA1 is 0.85. NA2 is preferably 0.55 or more, and is 0.7 or less. It is especially preferable that NA2 is 0.60 or 0.65. NA3 is preferably 0.4 or more, and is 0.55 or less. It is especially preferable that NA3 is 0.45 or 0.53.

It is preferable that the bonier of the central area and the peripheral area in the objective lens is formed in a portion corresponding to the range being 0.9·NA3 or more and being 1.2·NA3 or less (more preferably, 0.95·NA3 or more, and 1.15·NA3 or less) under the condition that the third light flux is used. More preferably, the border of the central area and the peripheral area of the objective lens is formed in a portion corresponding to NA3. Further, it is preferable that the border of the peripheral area and the most peripheral area of the objective lens is formed in a portion corresponding to the range being 0.9·NA2 or more, and being 1.2·NA2 or less (more preferably, being 0.95 NA2 or more, and being 1.15·NA2 or less) for the second light flux. More preferably, the border of the peripheral area and the most peripheral area of the objective lens is formed in a portion corresponding to NA2.

When the third light flux passing through the objective lens is converged on the information recording surface of the third optical disc, it is preferable that spherical aberration has at least one discontinuous portion. In that case, it is preferable that the discontinuous portion exists in the range being 0.9·NA3 or more, and being 1.2·NA3 or less (more preferably, being 0.95·NA3 or more, and being 1.15·NA3 or less) for the third light flux.

Further, when the spherical aberration is continuous and does not have the discontinuous portion, and when the third light flux passing through the objective lens is converged on the information recording surface of the third optical disc, it is preferable that the absolute value of the vertical spherical aberration is 0.03 μm or more in NA2, and the absolute value of the vertical spherical aberration is 0.02 pan or less in NA3. More preferably, the absolute value of the vertical spherical aberration is 0.08 μm or more in NA2, and the absolute value of the vertical spherical aberration is 0.01 μm or less in NA3.

Further, corresponding to the use of the optical pickup apparatus, diffraction efficiencies of the central area for respective wavelengths can be set properly. For example, in the case of the optical pickup apparatus which records and reproduces information for the first optical disc, and which just reproduces information for the second and the third optical discs, it is preferable that the diffraction efficiencies of the central area and/or the peripheral area are defined with considering primarily the diffraction efficiencies for the first light flux. On the other hand, in the case of the optical pickup apparatus which only reproduces information for the first optical discs and which records and reproduces information for the second and third optical discs, it is preferable that the diffraction efficiencies of the central area is defined with considering primarily the diffraction efficiencies for the second and third light fluxes and the diffraction efficiencies of the peripheral area is defined with considering primarily the diffraction efficiency for the second light flux.

In any of the above cases, when the following conditional expression (9) is satisfied, the diffraction efficiency of the first light flux calculated by the area-weighted mean can be secured high.

$$\eta 11 \leq \eta 21 \tag{9}$$

In the expression, η11 expresses a diffraction efficiency of the first light flux in the central area, η21 expresses a diffraction efficiency of the first light flux in the peripheral area. Hereupon, when the diffraction efficiencies of the central area is defined with considering primarily the light fluxes with the second and the third wavelengths, the diffraction efficiency of the first light flux of the central area is decreased. However, in the case where the numerical aperture of the first optical disc is larger than the numerical aperture of the third optical disc, when considered on the whole effective aperture of the first light flux, the decrease of diffraction efficiency in the central area does not give so much large influence.

Hereupon, the diffraction efficiency in the present specification can be defined as follows.

(1) The transmittance of an objective lens having the same focal length, the same lens thickness, and the same numerical aperture, being formed of the same material, and excluding the first and the second optical path difference providing structures, is measured for the central area and the peripheral area separately. In this case, the transmittance of the central area is measured with the light flux which enters into the peripheral area being shielded, and the transmittance of the peripheral area is measured with the light flux which enters into the central area being shielded.

(2) The transmittance of the objective optical lens including the first and the second optical path difference providing structures is measured for the central area and the peripheral area separately.

(3) The diffraction efficiencies of both areas are obtained by dividing the results of is divided by the respective results of (1).

Further, it can be configured to make light utilization efficiencies of any two of the first through three light fluxes 70% or more, and to make a light utilization efficiency of the rest light flux 30% or more and 70% or less. Alternatively, the light utilization efficiency of the rest light flux is made to be 40% or more and 60% or less. In this case, the light flux exhibiting the light utilization efficiency of the rest light flux is made to be 30% or more and 70% or less (or made to be 40% or more and 60% or less) is preferably the third light flux.

Incidentally, the light utilization efficiency mentioned here is defined to be calculated by A/B, where A represents a light amount within an airy disc of a converged spot formed on an information recording surface of an optical disc by the objective lens on which the fast optical path providing structure is formed (the second and third optical difference providing structures may also be formed), and B represents a light amount within an airy disc of a converged spot formed on an information recording surface of an optical information recording medium by the objective lens formed by the same material, having the same focal length, the same thickness on the axis, the same numerical aperture and same wavefront aberration, and on which the first, second and third optical path providing structures are not formed. Meanwhile, the airy disc mentioned here means a circle having radius r' whose center is on the optical axis of a converged spot. It is expressed by $r'=0.61 \cdot \lambda/NA$.

The following conditional expression (7) is preferably satisfied, where f1 (mm) is a focal length for the first light flux of the objective lens, and d (mm) is a center thickness of the objective lens.

$$0.7 \leq d/f1 \leq 1.5 \quad (7).$$

Further, the following conditional expression (7)' is more preferably satisfied.

$$1.0 \leq d/f1 < 1.5 \quad (7)'$$

When the objective lens corresponds to an optical disc such as a BD, having high NA and using a short wavelength, there is caused a problem that astigmatism is easily caused in the objective lens and that aberration of decentration coma is easily caused, too. However, the astigmatism and aberration of decentration coma can be controlled to be small when the conditional expressions (7) and (7)' are satisfied.

Further, when the conditional expressions (7) and (7)' are satisfied, it prevents the thickness on the optical axis of the objective lens from being excessively thick, does not makes the pitch of the optical path difference providing structure small, allows to secure a working distance when information is recorded/reproduced for a CD, and makes manufacturing of the objective lens easy, and further enables to keep a light utilization efficiency high, which are preferable.

Further, the following conditional expression is preferably satisfied.

$$2.1 \text{ mm} \leq \phi \leq 4.2 \text{ mm}$$

In the expression, $\phi$ represents an effective aperture of the objective lens under the condition that the second optical disc is used. When the above range is satisfied, a change of aberrations due to a change of temperature can be maintained to be a level which causes no problem, even when the objective lens is aplastic lens, with a working distance for a CD as the third optical disc being maintained to be a distance in a level which causes no problem to practical use.

The first light flux, the second light flux, and the third light flux may enter the objective lens as parallel light fluxes, or may enter the objective lens as divergent light fluxes or convergent light fluxes. Preferably, the image-forming magnification m1 of the objective lens when the first light flux enters the objective lens, satisfies the expression (11).

$$-0.01 < m1 < 0.01 \quad (11)$$

On the one hand, when the first light flux enters the objective lens as a divergent light flux, it is preferable that the image-forming magnification m1 of the objective lens when the first light flux enters the objective lens, satisfies the expression (11').

$$-0.10 < m1 < -0.01 \quad (11')$$

When the second light flux enters the objective lens as a parallel or almost parallel light flux, it is preferable that the image-forming manufacture m2 of the objective lens when the second light flux enters the objective lens, satisfies the expression (12).

$$-0.01 < m2 < 0.01 \quad (12)$$

On the one hand, when the second light flux enters the objective lens as a divergent light flux, it is preferable that the image-forming magnification m2 of the objective lens when the second light flux enters the objective lens, satisfies the expression (12').

$$-0.10 < m2 \leq 0.01 \quad (12')$$

When the third light flux enters the objective lens as a parallel or almost parallel light flux, it is preferable that the image-forming magnification m3 of the objective lens when the third light flux enters the objective lens, satisfies the expression (13). When the third light flux is a parallel light flux, problems can be caused easily in a tracking operation. However, the present invention can provide an excellent tracking characteristics even when the third light flux is a parallel light flux, and realizes recording and/or reproducing of information for three different optical discs.

$$-0.01 < m3 \leq 0.01 \quad (13)$$

On the one hand, when the third light flux enters the objective lens as a divergent light flux, it is preferable that the image-forming manufacture m3 of the objective lens when the third light flux enters the objective lens, satisfies the expression (13').

$$-0.10 < m3 \leq -0.01 \quad (13')$$

The working distance (WD) of the objective lens in the use of the third optical disc is preferably 0.15 mm or more, and 1.5 mm or less. It is more preferably 0.3 mm or more, and 0.9 mm or less. Next, the WD of the objective lens in the use of the second optical disc is preferably 0.4 mm or more, and 1.3 mm or less. Further more, the WD of the objective lens in the use of the first optical disc is preferably 0.4 mm or more, and 1.2 mm or less.

Further, when the objective lens of the invention is a plastic lens, there is a possibility that a relatively large spherical aberration occurs under a temperature change, depending on the design of the objective lens. Therefore, when the objective lens of the invention is a plastic lens, it is preferable that the optical pickup apparatus includes a spherical-aberration correcting means that corrects spherical aberration caused by a temperature change. As a spherical-aberration correcting means, there are given an example that spherical aberration caused by a temperature change is corrected by moving a coupling lens, a collimation lens, or a beam expander in the optical axis direction, and liquid crystal apparatuses. Incidentally, the spherical-aberration correcting means may double as a means which corrects spherical aberrations caused by other reasons. As spherical aberrations caused by other reasons, there are given spherical aberration caused between a certain information recording surface and another information recording surface when information is recorded and/or reproduced for an optical disc on which plural information recording surfaces are piled up, and spherical aberration corresponding to a fine inflection of a wavelength of a light source.

The optical information recording and reproducing apparatus according to the present invention, includes an optical disc drive apparatus including the above described optical pickup apparatus.

Herein, the optical disc drive apparatus installed in the optical information recording and reproducing apparatus will be described. There is provided an optical disc drive apparatus employing a system of taking only a tray which can hold an optical disc under the condition that the optical disc is mounted thereon, outside from the main body of the optical information recording and reproducing apparatus in which optical pickup apparatus is housed; and a system of taking out the main body of the optical disc drive apparatus in which the optical pickup apparatus is housed.

The optical information recording and reproducing apparatus using each of the above described systems, is generally provided with the following component members but the members are not limited to them: an optical pickup apparatus housed in a housing a drive source of the optical pickup apparatus such as seek-motor by which the optical pickup apparatus is moved toward the inner periphery or outer periphery of the optical disc for each housing; traveling means having a guide rail for guiding the optical pickup apparatus toward the inner periphery or outer periphery of the optical disc; and a spindle motor for rotation driving of the optical disc.

The optical information recording and reproducing apparatus employing the former system is provide with, other than these component members, a tray which can hold the optical disc with the optical disc being mounted thereon, and a loading mechanism for slidably moving the tray. The optical information recording and reproducing apparatus employing the latter system does not include the tray and loading mechanism, and it is preferable that each component member is provided in the drawer corresponding to chassis which can be taken out outside.

ADVANTAGEOUS EFFECT OF INVENTION

The invention makes it possible to exhibit desired optical characteristics and to prevent a structure of a mold from becoming to be excessively complicated, then, to improve transferability, and to simplify the structure, and thereby, to provide an objective lens capable of realizing low cost and to provide an optical pickup apparatus employing the objective lens.

Each of FIGS. 2a to 2d shows sectional views wherein some examples a through d of optical path difference providing structures which are provided on the objective lens relating to the invention, are shown schematically.

Figure 3A:
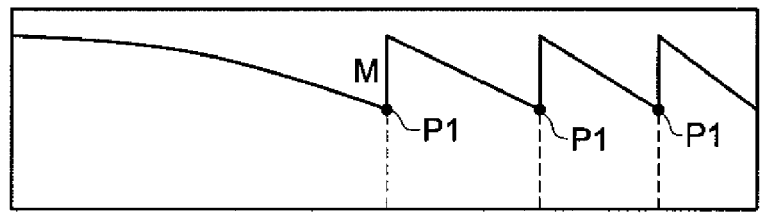
Figure 3B:
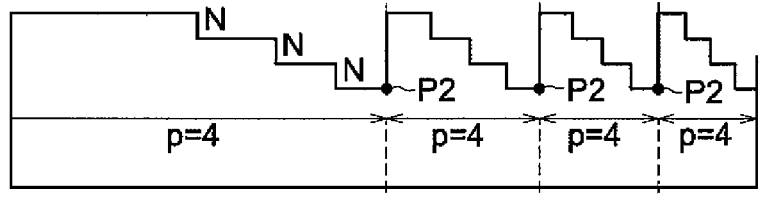
Figure 3C:
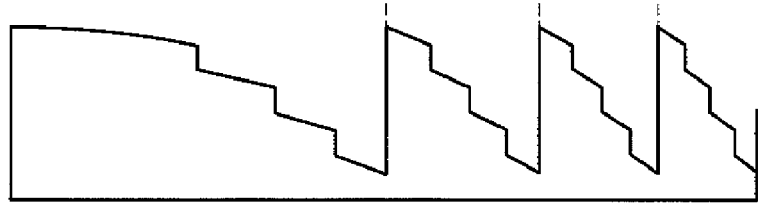

Each of FIGS. 3a to 3c is a diagram showing overlapping of optical path difference structures.

Figure 4:
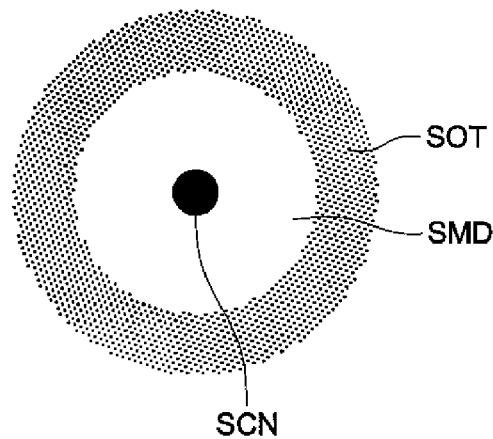

FIG. 4 is a diagram showing a form of a spot formed by the objective lens relating to the invention.

Figure 5:
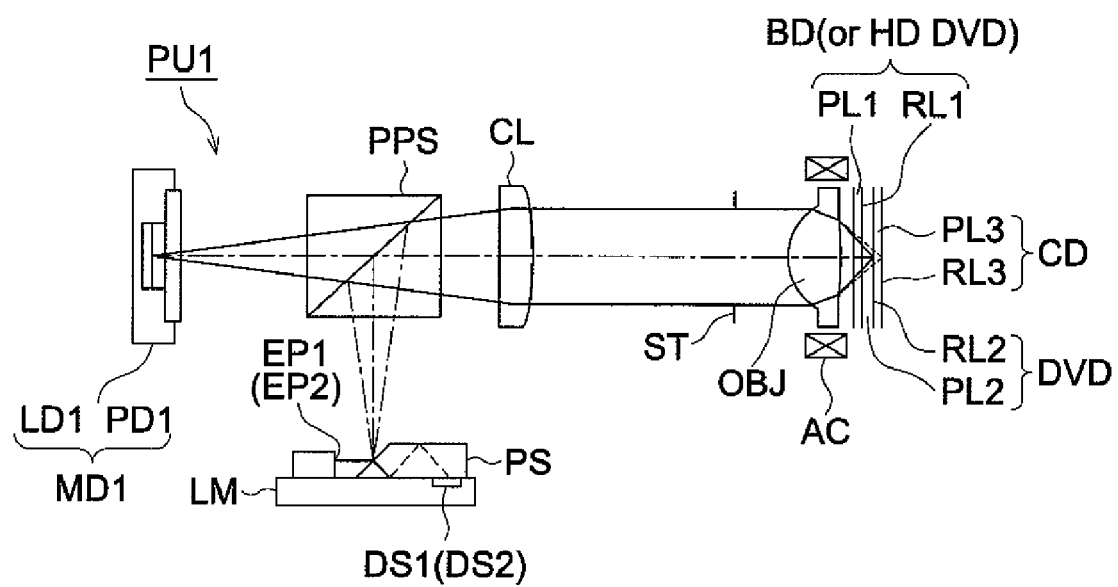

FIG. 5 is a diagram schematically showing the structure of an optical pickup apparatus relating to the invention.

Figure 6:
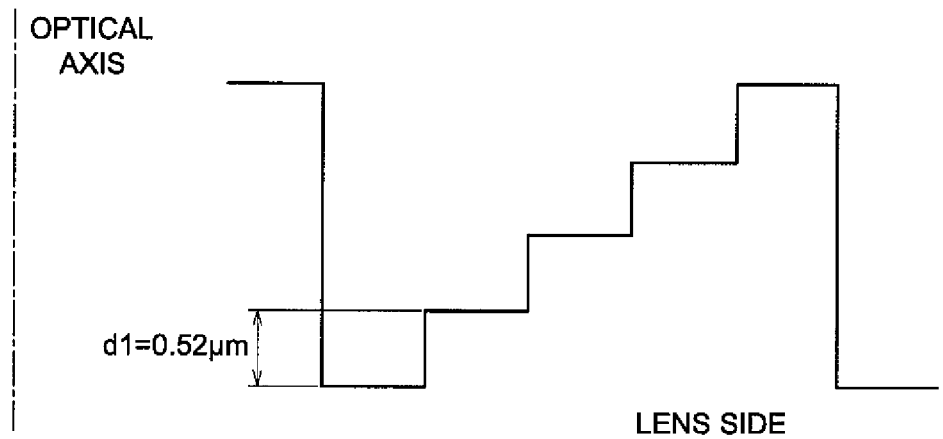

FIG. 6 is an enlarged sectional view of a step unit in Example 1.

Figure 7:
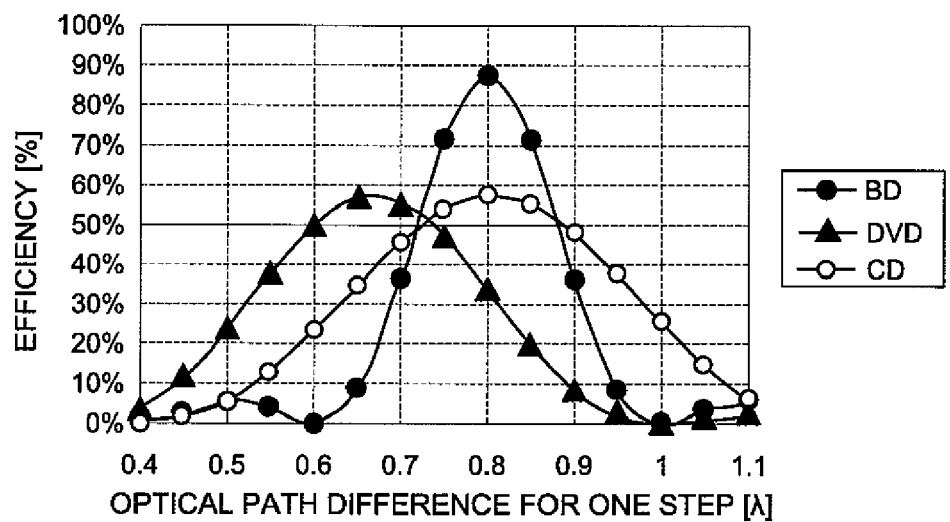

FIG. 7 is a graph showing diffraction efficiencies in Example 1.

Figure 8:
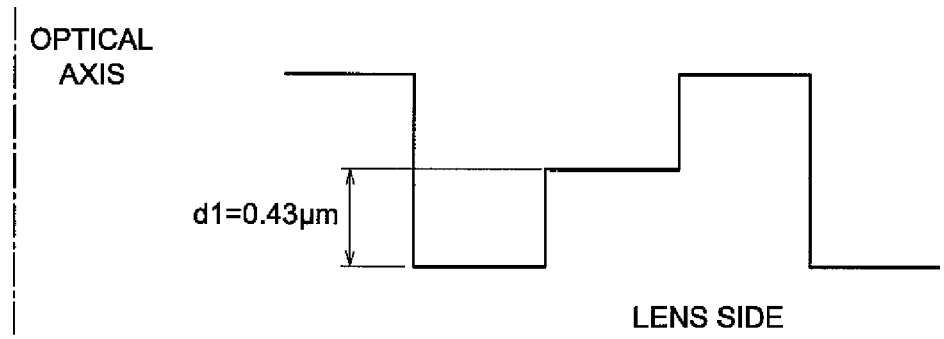

FIG. 8 is an enlarged sectional view of a step unit in Example 2.

Figure 9:
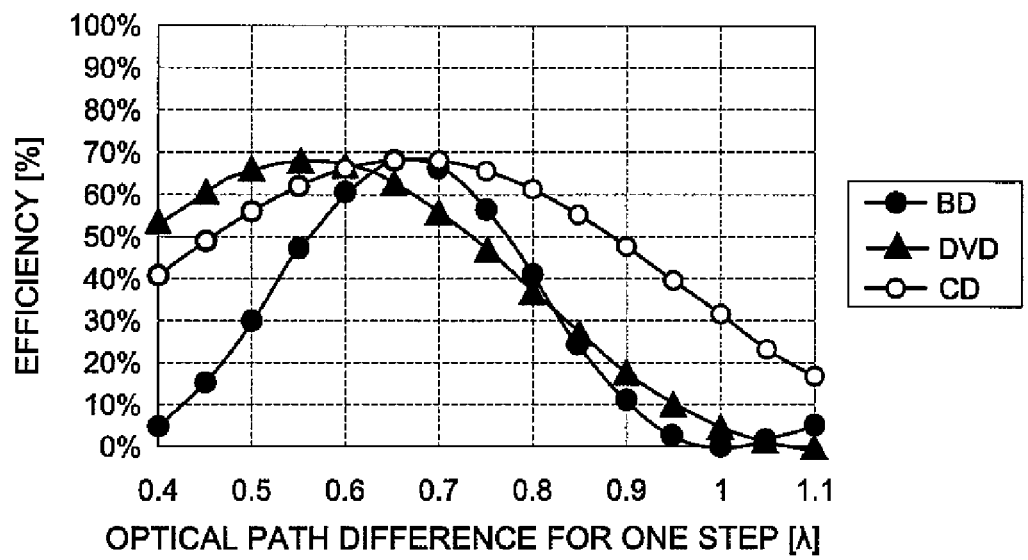

FIG. 9 is a graph showing diffraction efficiencies in Example 2.

Figure 10:
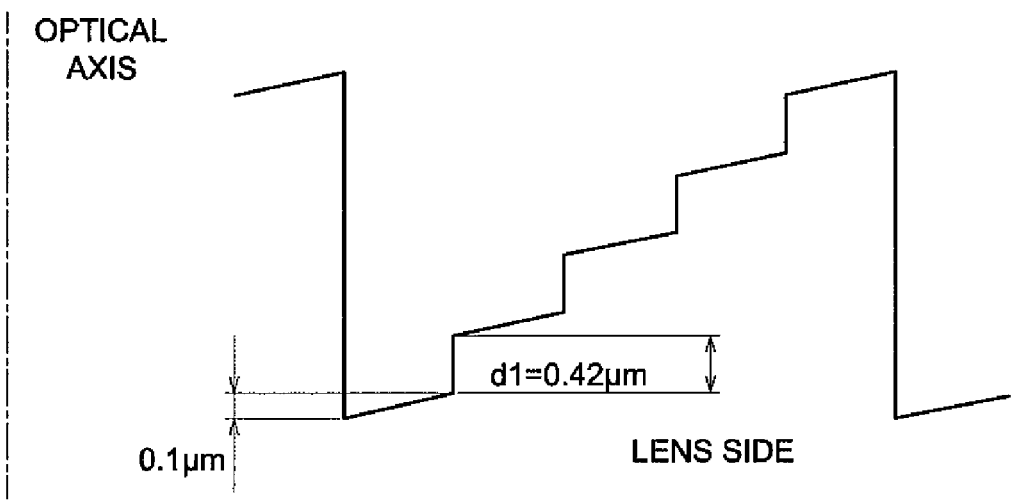

FIG. 10 is an enlarged sectional view of a step unit in Example 3.

Figure 11A:
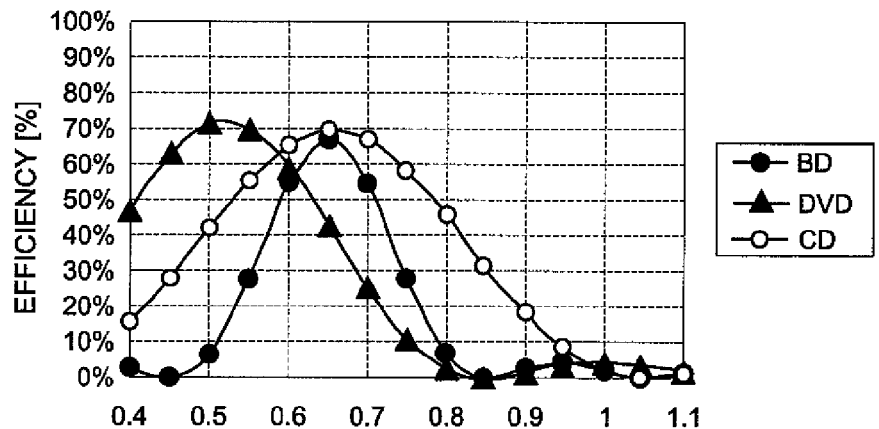
Figure 11B:
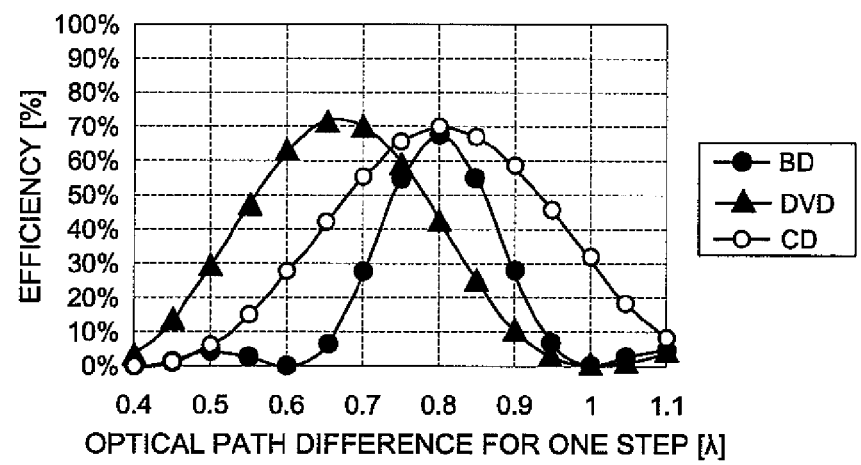

FIGS. 11a and 11b is a graph showing diffraction efficiencies in Example 3.

Figure 12:
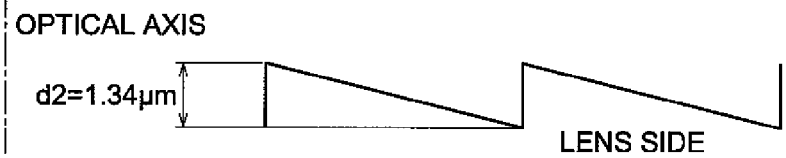

FIG. 12 shows a sectional view of a blaze structure of Example 4.

Figure 13:
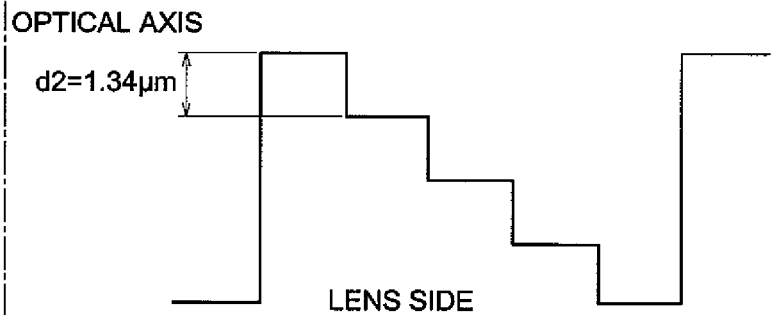

FIG. 13 shows a sectional view of a five-level step type structure of Example 5.

Figure 14:
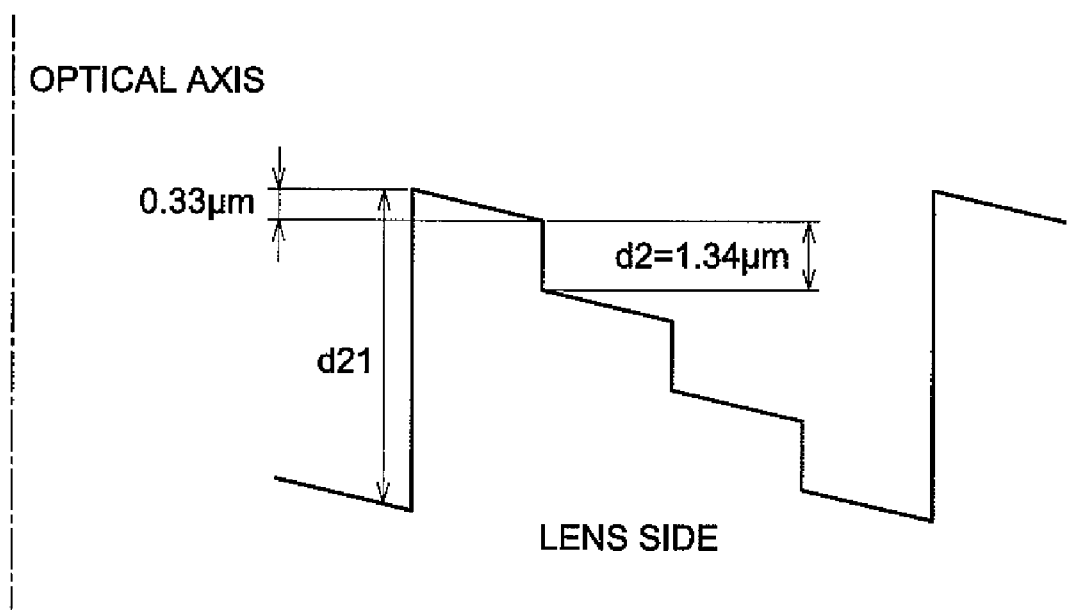

FIG. 14 shows a sectional view of a four-level step type structure of Example 6.

Figure 15:
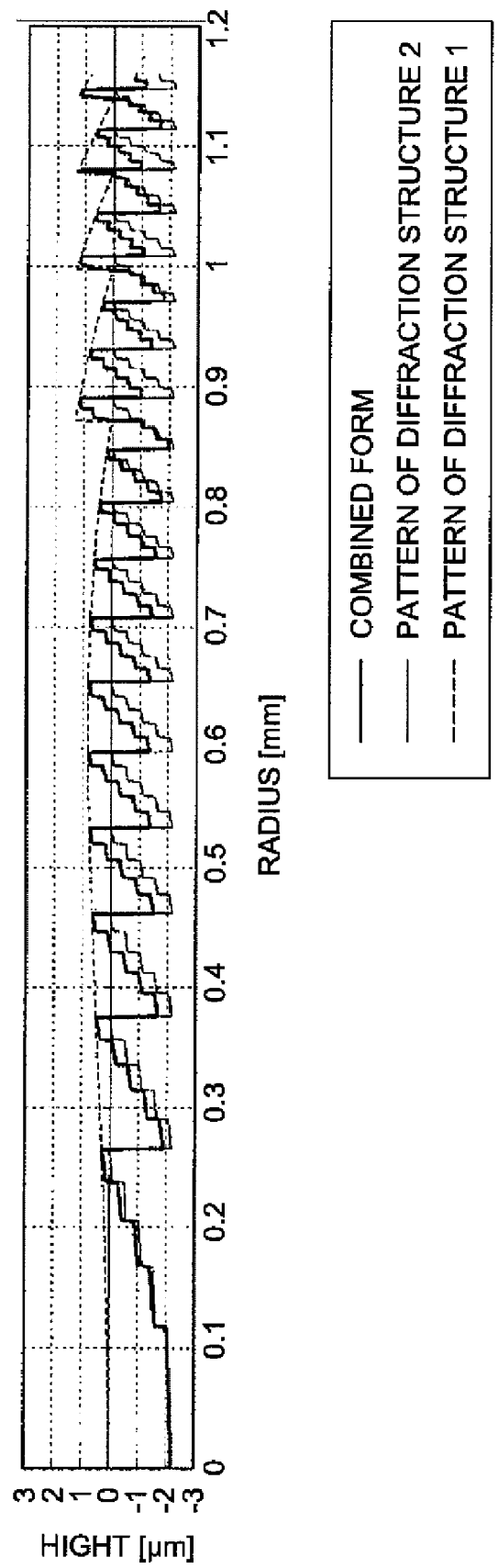

FIG. 15 shows a sectional view of the first optical path difference providing structure wherein the first basic structure and the second basic structure are overlapped together.

Figure 16:
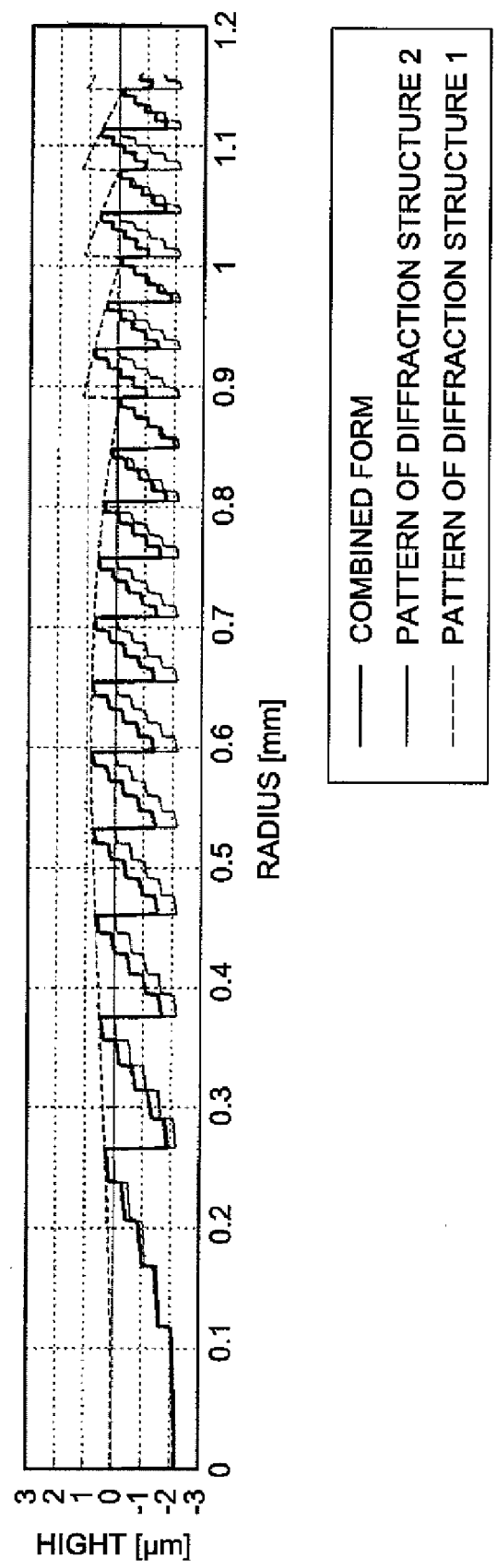

FIG. 16 shows a sectional view of the first optical path difference providing structure wherein the first basic structure and the second basic structure are overlapped together.

Figure 17:
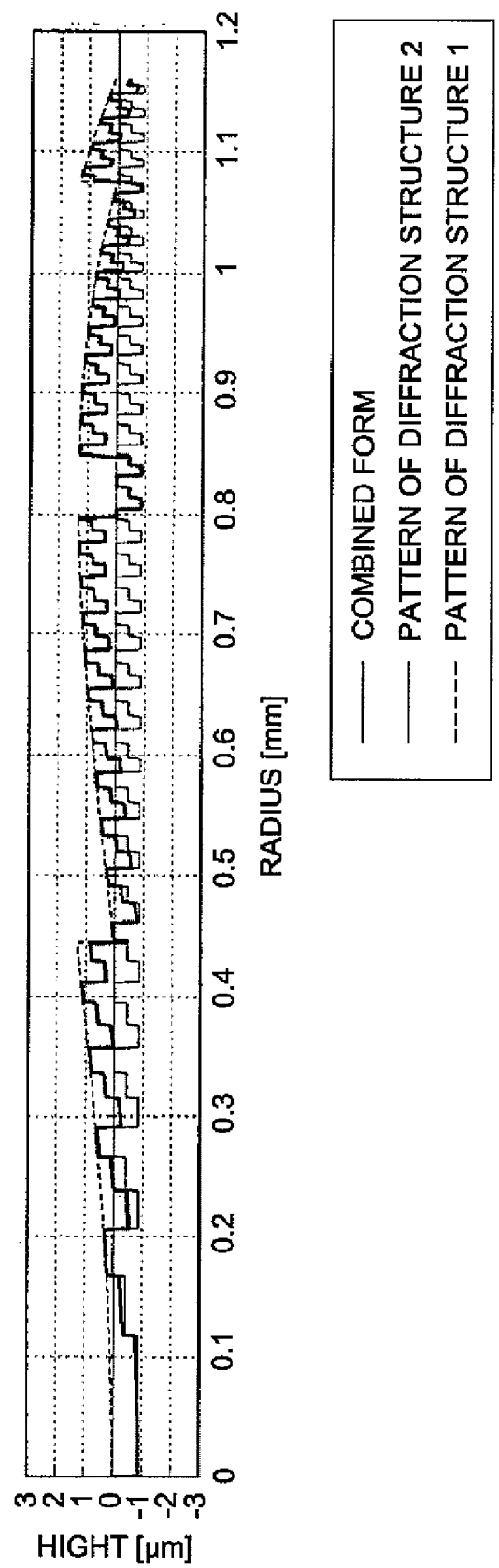

FIG. 17 is a diagram showing an example wherein the first basic structure and the second basic structure are overlapped together, but their repetition cycles do not agree, and a position of at least one step difference of the second basic structure does not agree with positions of large step differences of the first basic structure.

Figure 18:
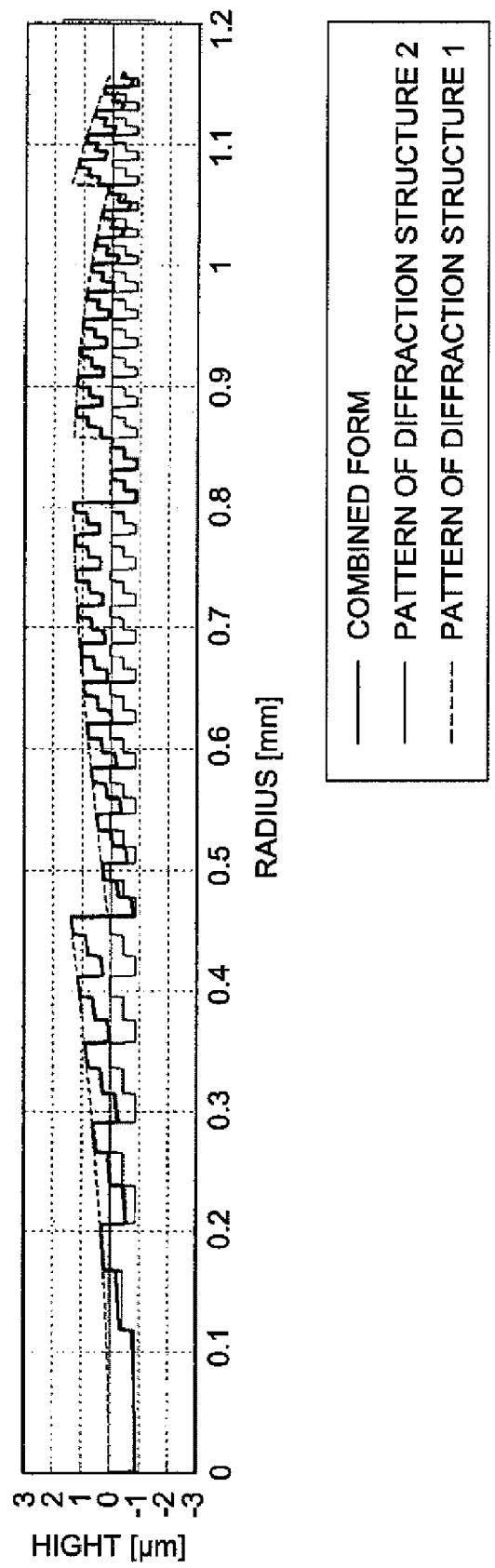

FIG. 18 is a diagram showing an example wherein overlapping is carried out so that positions of all step differences of the second basic structure may agree with positions of large step differences of the first basic structure.

DESCRIPTION OF EMBODIMENTS

Referring to the drawings, the embodiment of the present invention will be described below. FIG. 5 is a diagram schematically showing a construction of the optical pickup apparatus PU1 of the present embodiment capable of recording and/or reproducing information adequately for a BD, DVD and CD which are different optical discs. The optical pickup apparatus PU1 can be mounted in the optical information recording and reproducing apparatus. Herein, the first optical disc is a BD, the second optical disc is a DVD, and the third optical disc is a CD. Hereupon, the present invention is not limited to the present embodiment.

The optical pickup apparatus PU1 comprises objective lens OBJ; stop ST; collimation lens CL; dichroic prism PPS; first semiconductor laser LD1 (the first light source) which emits a laser light flux with a wavelength of $\lambda 1=405$ nm (the first light flux) when recording/reproducing information for ED; and first light-receiving element PD1 which receives the reflection light from information recording surface RL1 of a BD; and laser module LM.

Further, laser module LM comprises second semiconductor laser EP1 (the second light source) which emits the laser light flux with a wavelength of $\lambda 2=658$ nm (the second light flux) when recording and/or reproducing information for DVD; third semiconductor laser EP2 (the third light source)

emitting the laser light flux with a wavelength of λ3=785 nm (the third light flux) when recording and/or reproducing information for CD; second light-receiving element DS1 which receives the reflection light flux from the information recording surface RL2 of a DVD; the third light-receiving element DS2 which receives the reflection light flux from the information recording surface RL3 of a CD; and prism PS.

Figure 1A:
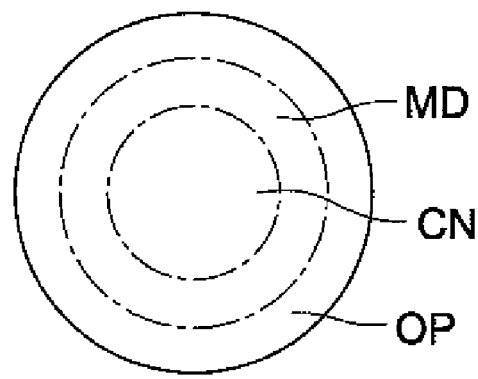
FIG. 1a is a diagram of an example of objective lens OBJ relating to the invention which is viewed in the optical axis direction.
Figure 1B:
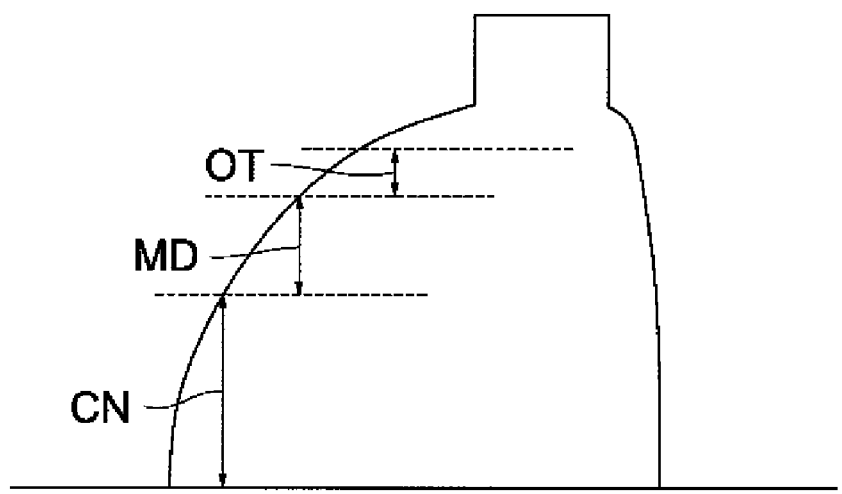
FIG. 1b is a sectional view.
Figure 2A:
Figure 2B:
Figure 2C:
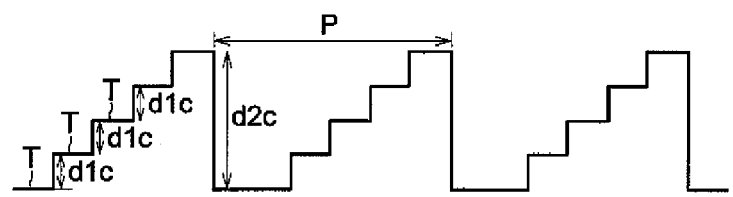
Figure 2D:
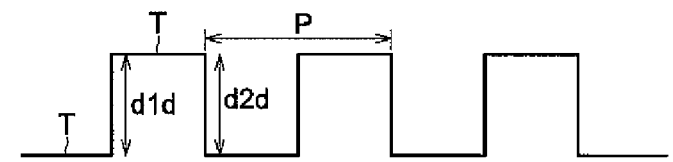

As shown in FIGS. 1a and 1b, in objective lens OBJ of the present embodiment, there are formed central area CN including the optical axis; peripheral area MD arranged around the central area; and most peripheral area OT further arranged around the peripheral area which are formed concentrically around the optical axis as a center. A first optical path difference providing structure in which the first basic structure and the second basic structure are overlapped together is formed in central area CN and a second optical path difference providing structure is formed in peripheral area MD, which are not illustrated in the figures. Further, there can be provided a most peripheral area OT in which a third optical path difference providing structure is formed, or a most peripheral area OT which is a refractive surface and does not include a third optical path difference providing structure. The first optical path difference providing structure, for example, is formed by overlapping a first basic structure and a second basic structure, where the first basic structure makes the L-th-order diffracted light flux for the first light flux which has passed through the first basic structure, larger than the amounts of diffracted light fluxes of any other orders, makes the amount of the M-th-order diffracted light flux for the second light flux larger than the amounts of diffracted light fluxes of any other orders, and makes the amount of the N-th-order diffracted light for the third light flux larger than the amounts of diffracted light fluxes of any other orders, and the second basic structure makes the X-th-order diffracted light flux for the first light flux which has passed through the second basic structure, larger than the amounts of diffracted light fluxes of any other orders, makes the amount of the Y-th-order diffracted light flux for the second light flux larger than the amounts of diffracted light fluxes of any other orders, and makes the amount of the Z-th-order diffracted light for the third light flux larger than the amounts of diffracted light fluxes of any other orders. In the present example, (L, M, N)=(1, −2, −2) or (1, 4, −1) holds, and (X, Y, Z)=(2, 1, 1), (0, 1, 0), or (2, 2, 1) holds. Herein, the first basic structure has a step structure in which plural ring-shaped step units are arranged concentrically about the optical axis as a center, and a step-difference amount d1 in the optical axis direction of a small step difference of the step unit satisfies the following conditional expression, where n is a refractive index of the objective lens OBJ for the first light flux.

$$0.5\lambda 1/(n-1) < d1 < \lambda 1/(n-1) \tag{1}$$

Further, the first optical path difference providing structure in which the first basic structure and the second basic structure are overlapped together, has a step structure in which plural ring-shaped step units (blaze-type step structure) are arranged concentrically about the optical axis as a center, and a step-difference amount d0 in the optical axis direction of a small step difference of the step unit satisfies the following conditional expression, where n is a refractive index of the objective lens OBJ for the that light flux.

$$0.5\lambda 1/(n-1) < d0 < \lambda 1/(n-1) \tag{10}$$

Blue-violet semiconductor laser diode LD1 emits a first light flux (λ1=405 nm) which is a divergent light flux. The divergent light flux passes through dichroic prism PPS, and is converted into a parallel light flux by collimation lens CL.

After that, the resulting light flux is converted from linear polarized light into circular polarized light by the ¼ wavelength plate which is not shown. The diameter of the converted light flux is regulated by stop ST, and the resulting light flux enters objective lens OBJ. The light flux which is converged by the central area, the peripheral area, and the most peripheral area, is formed into a spot on information recording surface RL1 of a BD through protective substrate PL1 with the thickness of 0.1 mm, then.

The reflection light flux which is modulated on the information recording surface RL1 by information pits, passes through objective lens OBJ and stop ST again, and is converted from circular polarized light into linear polarized light by the ¼ wavelength plate which is not shown. Then, collimation lens CL converts the light flux into a convergent light flux. The convergent light flux passes through dichroic prism PPS and is converged on the light receiving surface of the first light-receiving element PD1. Then, information recorded in a BD can be read based on the output signal of the first light-receiving element PD1, by focusing or tracking objective optical element OBJ using two-axis actuator AC.

Red semiconductor laser EP1 emits a second light flux (λ2=658 nm) which is a divergent light flux. The divergent light flux is reflected by prism PS and is further reflected by dichroic prism PPS. The light flux is converted into a parallel light flux by collimation lens CL. After that, the collimated light flux is converted in terms of polarization by the ¼ wavelength plate which is not shown. The resulting light flux enters into objective lens OBJ. Herein, the light flux converged by the central area and the peripheral area of the objective lens OBJ (the light flux passing through the most peripheral area is made into flare light, and forms the peripheral spot portion), becomes a spot on information recording surface RL2 of a DVD through the protective substrate PL2 with a thickness of 0.6 mm.

The reflection light flux which is modulated on information recording surface RL2 by information pits, passes through objective lens OBJ and stop ST again, and is converted in terms of polarization by the ¼ wavelength plate which is not shown. Then, the resulting light flux is converted by collimation lens CL into a convergent light flux, the convergent light flux is reflected by dichroic prism PPS, then, is reflected two times in the prism, and converged on the second light receiving element DS1. Then, the information recorded in DVD can be read by using the output signal of the second light-receiving element DS1. Herein, when the light flux on the returning path is converted in teens of polarization by the ¼ wavelength plate, the light utilization efficiency can make higher than the case that the ¼ wavelength plate is not employed.

Infrared semiconductor laser EP2 emits the third light flux (λ3=785 nm) which is a divergent light flux. The divergent light flux is reflected by prism PS, and further reflected by dichroic prism PPS. The resulting light flux is converted by collimation lens CL into a parallel light flux. After that, the resulting light flux is converted in terms of polarization by the ¼ wavelength plate which is not shown. The converted light flux enters objective lens OJT. Herein, the light flux converged by the central area of the objective lens OBJ (the light flux passing through the peripheral area and the most peripheral area is made into flare light, and forms the peripheral spot portion), becomes a spot on information recording surface RL3 of a CD through the protective substrate PL3 with thickness of 1.2 mm.

The reflection light flux which is modulated on information recording surface RU by information pits, passes through objective lens OBJ and stop ST again, and is converted in terms of polarization by the ¼ wavelength plate which is not shown. Then, the resulting light flux is converted into a convergent light flux by collimation lens CL, and is reflected by dichroic prism PPS, then, is further reflected two times in the prism. The reflected light flux is converged on the third light-receiving element DS2. Then, information recorded in a CD can be read by using output signal of the third light-receiving element DS2. Herein, when the light flux on the returning path is converted in terms of polarization by the ¼ wavelength plate, the light utilization efficiency can make higher than the case that the ¼ wavelength plate is not employed.

EXAMPLES

Examples which can be used for the aforesaid embodiments will be explained as follows. Incidentally, from now on (including lens data in Tables), the power of 10 will be expressed as by using "E" (for example, $2.5 \times 10^{-3}$ will be expressed as 2.5E-3).

The surface numbers in data of the Tables are numbered in order from the surface on the incidence side of light, and the objective lens is composed of the first surface and the second surface, and the optical disc is composed of the third surface and the fourth surface. A unit for the curvature radius is mm, and a unit of an axial surface distance is mm.

Meanwhile, t1 represents an axial surface distance between the objective lens and a recording medium, and t2 represents a thickness from the surface of a recording medium to the recording surface. Further, n1 through n3 represent respectively refractive indexes at λ1 through λ3, and νd represents Abbe's number for d line. Further, an optical surface of the lens is assumed to be prescribed by a numerical expression in which coefficients shown in Tables are substituted. In this case, each of the first surface and the second surface in the example is an aspheric surface, and an expression indicating a surface form of the aspheric surface is defined as follows.

$$z=(y^2/R)/[1+\sqrt{1-(K+1)(y/R)^2}]+A_4y^4+A_6y^6+A_8y^8+A_{10}y^{10}+A_{12}y^{12}+A_{14}y^{14}+A_{16}y^{16}+A_{18}y^{18}+A_{20}y^{20}$$

In the expression above, z represents an aspheric surface form (distance from a surface vertex of aspheric surface along the optical axis), y represents a distance from, the optical axis, R represents a curvature radius, K represents a conic constant and each of $A_4$, $A_6$, $A_8$, $A_{10}$, $A_{12}$, $A_{14}$, $A_{16}$, $A_{18}$ and $A_{20}$ represents a coefficient of aspheric surface. Further, an expression indicating an optical path difference function of the diffraction structure in the example is defined below.

$$\phi=B_2y^2+B_4y^4+B_6y^6+B_8y^8+B_{10}y^{10}$$

In the expression above, $ represents an optical path difference function, y represents a distance from the optical axis and each of $B_2$, $B_4$, $B_s$, $B_8$ and $B_{10}$ represents a diffractive surface coefficient.

Data which are common to the following Examples 1-3 are described in Table 7.

TABLE 7

| | BD | DVD | CD |
|---|---|---|---|
| Wavelength | λ1 = 405 nm | λ2 = 655 nm | λ3 = 785 nm |
| NA | 0.85 | 0.60 | 0.45 |
| Effective aperture | φ 3.74 mm | φ 2.75 mm | φ 2.32 mm |
| Focal length | 2.20 mm | 2.29 mm | 2.58 mm |

Example 1

In Example 1, the first basic structure is made to be a five-level step structure. The plus-first order diffracted light flux has the maximum diffracted-light amount among diffracted light fluxes generated when the first light flux enters the first basic structure, the minus-second order diffracted light flux has the maximum diffracted-light amount among diffracted light fluxes generated when the second light flux enters the first basic structure, and the minus-second order diffracted light flux has the maximum diffracted-light amount among diffracted light fluxes generated when the third light flux enters the first basic structure. The second basic structure is made to be a blaze structure. The plus-second order diffracted light flux has the maximum diffracted-light amount among diffracted light fluxes generated when the first light flux enters the second basic structure, the plus-first order diffracted light flux has the maximum diffracted-light amount among diffracted light fluxes generated when the second light flux enters the second basic structure, and the plus-first order diffracted light flux has the maximum diffracted-light amount among diffracted light fluxes generated when the third light flux enters the second basic structure. Lens data of Example 1 are shown in Table 8.

TABLE 8

| Example 1 | | | | | |
|---|---|---|---|---|---|
| Diameter of entrance pupil (mm) | | | 2.32 | | |
| Numerical aperture (CD) | | | 0.45 | | |

| Wavelength (nm) | | | | | |
|---|---|---|---|---|---|
| λ1 | | | 405 | | |
| λ2 | | | 655 | | |
| λ3 | | | 785 | | |

| Surface | Curvature radius (mm) | Center thickness (mm) | n1 | n2 | n3 | vd |
|---|---|---|---|---|---|---|
| 1 | 1.539340 | 2.590000 | 1.605367 | 1.586000 | 1.581901 | 59.9 |
| 2 | −4.021778 | t1 | | | | |
| 3 | ∞ | t2 | 1.619578 | 1.577488 | 1.570874 | 29.9 |
| 4 | ∞ | | | | | |

| | t1(mm) | t2(mm) |
|---|---|---|
| λ1 | 0.72 | 0.1 |
| λ2 | 0.73 | 0.6 |
| λ3 | 0.41 | 1.2 |

| Aspheric surface coefficient | | |
|---|---|---|
| Surface | 1 | 2 |
| K | −9.574479E−01 | −9.032854E+01 |
| A4 | 1.370628E−02 | 8.789009E−02 |
| A6 | 1.648644E−04 | −9.432693E−02 |
| A8 | 1.959932E−03 | 7.530334E−02 |
| A10 | −1.261241E−03 | −4.198083E−02 |
| A12 | 2.928124E−04 | 1.296877E−02 |
| A14 | 2.169644E−04 | −1.657336E−03 |
| A16 | −1.692984E−04 | 0.000000E+00 |
| A18 | 4.531635E−05 | 0.000000E+00 |
| A20 | −4.445600E−06 | 0.000000E+00 |

| Diffractive surface coefficient | | |
|---|---|---|
| Surface | Diffraction structure pattern 1 | Diffraction structure pattern 2 |
| B2 | −5.726703E−03 | 1.332489E−03 |
| B4 | 1.481028E−04 | −1.748415E−03 |

Example 2

In Example 2, the first basic structure is made to be a three-level step structure. The plus-first order diffracted light flux has the maximum diffracted-light amount among diffracted light fluxes generated when the first light flux enters the first basic structure, the minus-first order diffracted light flux has the maximum diffracted-light amount among diffracted light fluxes generated when the second light flux enters the first basic structure, and the minus-first order diffracted light flux has the maximum diffracted-light amount among diffracted light fluxes generated when the third light flux enters the first basic structure. The second basic structure is made to be a blaze structure. The plus-second order diffracted light flux has the maximum diffracted-light amount among diffracted light fluxes generated when the first light flux enters the second basic structure, the plus-first order diffracted light flux has the maximum diffracted-light amount among diffracted light fluxes generated when the second light flux enters the second basic structure, and the plus-first order diffracted light flux has the maximum diffracted-light amount among diffracted light fluxes generated when the third light flux enters the second basic structure. Lens data of Example 2 are shown in Table 9.

TABLE 9

Example 2

| | | |
|---|---|---|
| Diameter of entrance pupil (mm) | | 2.32 |
| Numerical aperture (CD) | | 0.45 |

Wavelength (nm)

| | |
|---|---|
| $\lambda 1$ | 405 |
| $\lambda 2$ | 655 |
| $\lambda 3$ | 785 |

| Surface | Curvature radius (mm) | Center thickness (mm) | n1 | n2 | n3 | vd |
|---|---|---|---|---|---|---|
| 1 | 1.552381 | 2.590000 | 1.605367 | 1.586000 | 1.581901 | 59.9 |
| 2 | −4.021778 | t1 | | | | |
| 3 | ∞ | t2 | 1.619578 | 1.577488 | 1.570874 | 29.9 |
| 4 | ∞ | | | | | |

| | t1(mm) | t2(mm) |
|---|---|---|
| $\lambda 1$ | 0.72 | 0.1 |
| $\lambda 2$ | 0.73 | 0.6 |
| $\lambda 3$ | 0.41 | 1.2 |

Aspheric surface coefficient

| Surface | 1 | 2 |
|---|---|---|
| K | −9.710078E−01 | −9.032854E+01 |
| A4 | 1.399131E−02 | 8.789009E−02 |
| A6 | 1.648644E−04 | −9.432693E−02 |
| A8 | 1.959932E−03 | 7.530334E−02 |
| A10 | −1.261241E−03 | −4.198083E−02 |
| A12 | 2.928124E−04 | 1.296877E−02 |
| A14 | 2.169644E−04 | −1.657336E−03 |
| A16 | −1.692984E−04 | 0.000000E+00 |
| A18 | 4.531635E−05 | 0.000000E+00 |
| A20 | −4.445600E−06 | 0.000000E+00 |

Diffractive surface coefficient

| Surface | Diffraction structure pattern 1 | Diffraction structure pattern 2 |
|---|---|---|
| B2 | −9.542866E−03 | 2.400675E−03 |
| B4 | 2.547894E−04 | −1.772406E−03 |

Example 3

In Example 1, the first basic structure is made to be a five-level blaze-type step structure. The plus-first order diffracted light flux has the maximum diffracted-light amount among diffracted light fluxes generated when the first light flux enters the first basic structure, the minus-second order diffracted light flux has the maximum diffracted-light amount among diffracted light fluxes generated when the second light flux enters the first basic structure, and the minus-second order diffracted light flux has the maximum diffracted-light amount among diffracted light fluxes generated when the third light flux enters the first basic structure. The second basic structure is made to be a blaze structure. The plus-second order diffracted light flux has the maximum diffracted light amount among diffracted light fluxes generated when the first light flux enters the second basic structure, the plus-first order diffracted light flux has the maximum diffracted-light amount among diffracted light fluxes generated when the second light flux enters the second basic structure, and the plus-first order diffracted light flux has the maximum diffracted-light amount among diffracted light fluxes generated when the third light flux enters the second basic structure. Lens data of Example 3 are shown in Table 3.

TABLE 10

Example 3

| | | |
|---|---|---|
| Diameter of entrance pupil (mm) | | 2.32 |
| Numerical aperture (CD) | | 0.45 |

Wavelength (nm)

| | |
|---|---|
| $\lambda 1$ | 405 |
| $\lambda 2$ | 655 |
| $\lambda 3$ | 785 |

| Surface | Curvature radius (mm) | Center thickness (mm) | n1 | n2 | n3 | vd |
|---|---|---|---|---|---|---|
| 1 | 1.539340 | 2.590000 | 1.605367 | 1.586000 | 1.581901 | 59.9 |
| 2 | −4.021778 | t1 | | | | |
| 3 | ∞ | t2 | 1.619578 | 1.577488 | 1.570874 | 29.9 |
| 4 | ∞ | | | | | |

| | t1(mm) | t2(mm) |
|---|---|---|
| $\lambda 1$ | 0.72 | 0.1 |
| $\lambda 2$ | 0.73 | 0.6 |
| $\lambda 3$ | 0.41 | 1.2 |

Aspheric surface coefficient

| Surface | 1 | 2 |
|---|---|---|
| K | −9.574479E−01 | −9.032854E+01 |
| A4 | 1.370628E−02 | 8.789009E−02 |
| A6 | 1.648644E−04 | −9.432693E−02 |
| A8 | 1.959932E−03 | 7.530334E−02 |
| A10 | −1.261241E−03 | −4.198083E−02 |
| A12 | 2.928124E−04 | 1.296877E−02 |
| A14 | 2.169644E−04 | −1.657336E−03 |
| A16 | −1.692984E−04 | 0.000000E+00 |
| A18 | 4.531635E−05 | 0.000000E+00 |
| A20 | −4.445600E−06 | 0.000000E+00 |

Diffractive surface coefficient

| Surface | Diffraction structure pattern 1 | Diffraction structure pattern 2 |
|---|---|---|
| B2 | −5.726703E−03 | 1.332489E−03 |
| B4 | 1.481028E−04 | −1.748415E−03 |

Consideration for Examples 1-3

When the diffraction order number of for diffracted light flux in the use of a BD is defined to be positive, signs of diffraction order numbers of diffracted light fluxes in the use of a DVD and CD are determined automatically. When a difference between the diffraction order number for BD and that for CD is greater, a pitch of the first basic structure can be made greater, resulting in easy manufacturing which means that designed shapes themselves can be formed in a mold processing process and a lens forming process. In the present example, the diffraction order number for BD is different from that for CD in terms of sign, resulting in a large difference in the diffraction order number, which exhibits an effect of easy manufacturing.

In the more specific explanation, when an optical path difference provided by a step-difference amount d1 in the optical axis direction for one step in a step structure is expressed by a multiple of a wavelength, there is relationship that its multiple (decimal portion) is greater than 0.5 for BD and is smaller than 0.5 for CD, in the present example. Therefore, signs of the diffraction-order number are different from each other. In the present example, a height of one step of the step structure is lower by far than that in conventional examples, which exhibits an effect of easy manufacturing.

In the conventional examples, the diffraction efficiency of a diffracted light flux in the use of a CD is as low as 42%. If this 42% is raised to 50% or higher, more appropriate recording and/or reproducing of information can be practiced. In the present example, the diffraction efficiencies of diffracted light fluxes in the use of a BD and CD are 50% or more, thus, sufficient efficiency can be obtained.

Example 4

In Example 4, the objective lens includes a central area, a peripheral area and a most peripheral area. The central area includes a first optical path difference providing structure, the peripheral area has a second optical path difference providing structure, and the most peripheral area has a third optical path difference providing structure.

The first optical path difference providing structure is a structure wherein a first basic structure and a second basic structure are overlapped together. The first basic structure is a five-level step structure. The plus-first order diffracted light flux has the maximum diffracted-light amount among diffracted light fluxes generated when the first light flux enters the first basic structure, the minus-second order diffracted light flux has the maximum diffracted-light amount among diffracted light fluxes generated when the second light flux enters the first basic structure, and the minus-second order diffracted light flux has the maximum diffracted-light amount among diffracted light fluxes generated when the third light flux enters the first basic structure. The second basic structure is made to be a blaze structure. The plus-second order diffracted light flux has the maximum diffracted-light amount among diffracted light fluxes generated when the first light flux enters the second basic structure, the plus-first order diffracted light flux has the maximum diffracted-light amount among diffracted light fluxes generated when the second light flux enters the second basic structure, and the plus-first order diffracted light flux has the maximum diffracted-light amount among diffracted light fluxes generated when the third light flux enters the second basic structure.

The second optical path difference providing structure is a five-level step structure. The plus-first order diffracted light flux has the maximum diffracted-light amount among diffracted light fluxes generated when the first light flux enters the second optical path difference providing structure, and the minus-first order diffracted light flux has the maximum diffracted light amount among diffracted light fluxes generated when the second light flux enters the second optical path difference providing structure.

The third optical path difference providing structure is a blaze structure. The plus-fifth order diffracted light flux has the maximum diffracted-light amount among diffracted light fluxes generated when the first light flux enters the third optical path difference providing structure.

Each of Table 11 and Table 12 shows lens data of Example 4.

TABLE 11

| | Specifications | | |
|---|---|---|---|
| | BD | DVD | CD |
| Focal length f (mm) | 2.200 | 2.399 | 2.438 |
| Wavelength λ (nm) | 405 | 658 | 785 |
| NA | 0.85 | 0.6 | 0.45 |
| Effective aperture φ (mm) | 3.740 | 2.909 | 2.217 |
| Magnification | 0 | −0.0154 | −0.0157 |
| WD | 0.671 | 0.638 | 0.369 |
| Disc thickness (mm) | 0.0875 | 0.60 | 1.10 |

| | | | Arrangement | | | | | |
|---|---|---|---|---|---|---|---|---|
| | | | BD | | DVD | | CD | |
| $i^{th}$ Surface | Distance from optical axis | ri | di (405 nm) | ni (405 nm) | di (658 nm) | ni (658 nm) | di (785 nm) | ni (785 nm) | Remarks |
| 0 | | | ∞ | | 156.98 | | 156.98 | | |
| 1 (Stop diameter φ mm) | | ∞ | 0.0 (3.74) | 1.0000 | 0.0 (2.91) | 1.0000 | 0.0 (2.22) | 1.0000 | Stop |
| 2-1 | 0.000 ≦ h < 1.27 | 1.4468 | 2.6800 | 1.5592 | 2.6800 | 1.5397 | 2.6800 | 1.5363 | Aspheric surface |
| 2-2 | 1.27 ≦ h < 1.463 | 1.5740 | 0.0087 | 1.5592 | 0.0087 | 1.5397 | 0.0087 | 1.5363 | Aspheric surface |

TABLE 11-continued

| | | | | | | | | | |
|---|---|---|---|---|---|---|---|---|---|
| 2-3 | $1.463 \leq h$ | 1.5740 | 0.0087 | 1.5592 | 0.0087 | 1.5397 | 0.0087 | 1.5363 | Aspheric surface |
| 3-1 | $0 \leq h < 0.523$ | −2.8536 | 0.6715 | 1.0000 | 0.6380 | 1.0000 | 0.3690 | 1.0000 | Aspheric surface |
| 3-2 | $0.523 \leq h$ | −2.8991 | 0.0000 | 1.0000 | 0.0000 | 1.0000 | 0.0000 | 1.0000 | Aspheric surface |
| 4 | | ∞ | 0.0875 | 1.6195 | 0.6000 | 1.5772 | 1.1000 | 1.5706 | Disc |
| 5 | | ∞ | | | | | | | |

| Aspheric surface coefficient | | | | | |
|---|---|---|---|---|---|
| | $(2\text{-}1)^{th}$ surface | $(2\text{-}2)^{th}$ surface | $(2\text{-}3)^{th}$ surface | $(3\text{-}1)^{th}$ surface | $(3\text{-}2)^{th}$ surface |
| κ | −3.2344E−01 | −4.6298E−01 | −4.6298E−01 | −1.0871E+01 | −1.2849E+01 |
| A4 | −1.4771E−02 | 1.8520E−02 | 1.8520E−02 | 2.9971E−01 | 2.4866E−01 |
| A6 | 2.9722E−03 | −2.2994E−03 | −2.2994E−03 | −4.7260E−01 | −2.7275E−01 |
| A8 | −3.3648E−03 | −1.4138E−03 | −1.4138E−03 | 4.4419E−01 | 1.8199E−01 |
| A10 | 1.7737E−04 | 1.2613E−03 | 1.2613E−03 | −7.5384E−02 | −7.1347E−02 |
| A12 | 7.6966E−05 | −2.8143E−04 | −2.8143E−04 | 2.2456E−02 | 1.3939E−02 |
| A14 | −1.8606E−05 | 2.5813E−05 | 2.5813E−05 | −5.0789E−03 | −8.2053E−04 |

*di − j(j ≠ 1) represents a displacement from $(di-1)^{th}$ surface to $(di-j)^{th}$ surface.
*di − 1 represents a displacement from $(di-1)^{th}$ surface to $d(I+1)^{th}$ surface

TABLE 12

| Optical path difference function coefficient | | | | |
|---|---|---|---|---|
| | | $(2\text{-}1)^{th}$ surface | $(2\text{-}2)^{th}$ surface | $(2\text{-}3)^{th}$ surface |
| Diffraction structure 1 | λB (nm) | 405 | 405 | 405 |
| | Order number (BD/DVD/CD) | 2/1/1 | 1/−1/— | 5/—/— |
| | C1 | 1.3859E−03 | −8.8104E−03 | −1.7621E−03 |
| | C2 | −2.7609E−03 | 3.6773E−03 | 7.3546E−04 |
| | C3 | 1.6226E−03 | −2.5031E−03 | −5.0062E−04 |
| | C4 | −1.0315E−03 | 7.9296E−04 | 1.5859E−04 |
| | C5 | 2.3466E−04 | −1.0177E−04 | −2.0354E−05 |
| Diffraction structure 2 | λB (nm) | 405 | | |
| | Order number (BD/DVD/CD) | 1/−2/−2 | | |
| | C1 | −4.4679E−03 | | |
| | C2 | 4.0330E−04 | | |
| | C3 | −1.1115E−04 | | |
| | C4 | −2.4946E−06 | | |
| | C5 | 1.2808E−05 | | |

| Form and efficiency of diffraction structure | | | | |
|---|---|---|---|---|
| | | $(2\text{-}1)^{th}$ surface | $(2\text{-}2)^{th}$ surface | $(2\text{-}3)^{th}$ surface |
| Diffraction structure 1 | Diffraction structure type | Blaze type | Step type | Blaze type |
| | Number of steps (within a cycle) | — | 5 | — |
| | BD Diffraction efficiency | 1.00 | 0.71 | 1.00 |
| | DVD Diffraction efficiency | 0.89 | 0.66 | — |
| | CD Diffraction efficiency | 1.00 | — | — |
| Diffraction structure 2 | Diffraction structure type | Step type | | |
| | Number of steps (within a cycle) | 5 | | |
| | BD Diffraction efficiency | 0.82 | | |
| | DVD Diffraction efficiency | 0.44 | | |
| | CD Diffraction efficiency | 0.56 | | |

Example 5

In Example 5, the objective lens includes a central area, a peripheral area and a most peripheral area. The central area includes a first optical path difference providing structure, the peripheral area has a second optical path difference providing structure, and the most peripheral area has a third optical path difference providing structure.

The first optical path difference providing structure is a structure wherein a first basic structure and a second basic structure are overlapped together. The first basic structure is a three-level step structure. The plus-first order diffracted light flux has the maximum diffracted-light amount among diffracted light fluxes generated when the first light flux enters the first basic structure, the minus-first order diffracted light flux has the maximum diffracted-light amount among diffracted light fluxes generated when the second light flux enters the first basic structure, and the minus-first order diffracted light flux has the maximum diffracted-light amount among diffracted light fluxes generated when the third light flux enters the first basic structure. The second basic structure is made to be a blaze structure. The plus-second order diffracted light flux has the maximum diffracted-light amount among diffracted light fluxes generated when the first light flux enters the second basic structure, the plus-first order diffracted light flux has the maximum diffracted-light amount among diffracted light fluxes generated when the second light flux enters the second basic structure, and the plus-first order diffracted light flux has the maximum diffracted-light amount among diffracted light fluxes generated when the third light flux enters the second basic structure.

The second optical path difference providing structure is a five-level step structure. The plus-first order diffracted light flux has the maximum diffracted-light amount among diffracted light fluxes generated when the first light flux enters the second optical path difference providing structure, and the minus-first order diffracted light flux has the maximum diffracted-light amount among diffracted light fluxes generated when the second light flux enters the second optical path difference providing structure.

The third optical path difference providing structure is a blaze structure. The plus-fifth order diffracted light flux has the maximum diffracted-light amount among diffracted light fluxes generated when the first light flux enters the third optical path difference providing structure.

Each of Table 13 and Table 14 shows lens data of Example 5.

TABLE 13

Specifications

|  | BD | DVD | CD |
|---|---|---|---|
| Focal length f (mm) | 2.200 | 2.431 | 2.466 |
| Wavelength λ (nm) | 405 | 660 | 785 |
| NA | 0.85 | 0.6 | 0.47 |
| Effective aperture φ (mm) | 3.740 | 2.950 | 2.344 |
| Magnification | 0 | −0.0164 | −0.0166 |
| WD | 0.667 | 0.684 | 0.410 |
| Disc thickness (mm) | 0.0875 | 0.60 | 1.10 |

Arrangement

| | | | BD | | DVD | | CD | | |
|---|---|---|---|---|---|---|---|---|---|
| $i^{th}$ Surface | Distance from optical axis | ri | di (405 nm) | ni (405 nm) | di (660 nm) | ni (660 nm) | di (785 nm) | ni (785 nm) | Remarks |
| 0 | | ∞ | | | 150.00 | | 150.00 | | |
| 1 (Stop diameter φ mm) | | ∞ | 0.0 (3.74) | 1.0000 | 0.0 (2.95) | 1.0000 | 0.0 (2.34) | 1.0000 | Stop |
| 2-1 | $0.0 \leq h < 1.2$ | 1.4964 | 2.6800 | 1.5592 | 2.6800 | 1.5397 | 2.6800 | 1.5363 | Aspheric surface |
| 2-2 | $1.2 \leq h < 1.5$ | 1.4461 | −0.0067 | 1.5592 | −0.0067 | 1.5397 | −0.0067 | 1.5363 | Aspheric surface |
| 2-3 | $1.5 \leq h$ | 1.4591 | 0.0310 | 1.5592 | 0.0310 | 1.5397 | 0.0310 | 1.5363 | Aspheric surface |
| 3 | | −2.8854 | 0.6670 | 1.0000 | 0.6840 | 1.0000 | 0.4100 | 1.0000 | Aspheric surface |
| 4 | | ∞ | 0.0875 | 1.6195 | 0.6000 | 1.5772 | 1.1000 | 1.5706 | Disc |
| 5 | | ∞ | | | | | | | |

Aspheric surface coefficient

|  | $(2\text{-}1)^{th}$ surface | $(2\text{-}2)^{th}$ surface | $(2\text{-}3)^{th}$ surface | $3^{rd}$ surface |
|---|---|---|---|---|
| κ | −6.8435E−01 | −8.4826E−01 | −6.7860E−01 | −4.9857E+01 |
| A4 | 4.8110E−03 | 1.0712E−02 | 1.2840E−02 | 9.8378E−02 |
| A6 | −1.1704E−03 | 3.2767E−04 | 2.9640E−03 | −1.0070E−01 |
| A8 | 3.2668E−03 | 2.3812E−03 | 2.5410E−03 | 7.6815E−02 |
| A10 | −1.8364E−03 | −9.9651E−04 | −1.2522E−03 | −4.0568E−02 |
| A12 | 2.9333E−04 | 3.4743E−04 | 1.6414E−04 | 1.2134E−02 |
| A14 | 2.1701E−04 | 1.2739E−04 | 1.6597E−04 | −1.6300E−03 |
| A16 | −1.6929E−04 | −1.6394E−04 | −1.5645E−04 | 3.6154E−05 |
| A18 | 4.5317E−05 | 5.4564E−05 | 5.2193E−05 | 0.0000E+00 |
| A20 | −4.4456E−06 | −6.2896E−06 | −5.9924E−06 | 0.0000E+00 |

*di − j(j ≠ 1) represents a displacement from (di − 1)$^{th}$ surface to (di − j)$^{th}$ surface.
*di − 1 represents a displacement from (di − 1)$^{th}$ surface to d(I + 1)$^{th}$ surface

TABLE 14

Optical path difference function coefficient

| | | $(2\text{-}1)^{th}$ surface | $(2\text{-}2)^{th}$ surface | $(2\text{-}3)^{th}$ surface |
|---|---|---|---|---|
| Diffraction structure 1 | λB (nm) | 405 | 405 | 405 |
| | Order number (BD/DVD/CD) | 2/1/1 | 1/−1/— | 5/—/— |
| | C1 | 0.0000E+00 | −6.6000E−03 | 2.0796E−03 |
| | C2 | −1.7958E−03 | −4.1775E−03 | 1.1822E−04 |
| | C3 | −2.0655E−05 | 3.5003E−05 | −3.3259E−05 |
| | C4 | 1.9193E−04 | −1.3105E−03 | −1.9241E−05 |
| | C5 | −1.1060E−04 | 1.7653E−04 | −6.2201E−06 |
| Diffraction structure 2 | λB (nm) | 405 | | |
| | Order number (BD/DVD/CD) | 1/−1/−1 | | |
| | C1 | −8.6276E−03 | | |
| | C2 | 5.6112E−04 | | |
| | C3 | −2.1377E−04 | | |
| | C4 | 2.0343E−05 | | |
| | C5 | 1.0663E−05 | | |

Form and efficiency of diffraction structure

| | | $(2\text{-}1)^{th}$ surface | $(2\text{-}2)^{th}$ surface | $(2\text{-}3)^{th}$ surface |
|---|---|---|---|---|
| Diffraction structure 1 | Diffraction structure type | Blaze type | Step type | Blaze type |
| | Number of steps (within a cycle) | — | 5 | — |
| | BD Diffraction efficiency | 1.00 | 0.71 | 1.00 |
| | DVD Diffraction efficiency | 0.89 | 0.66 | — |
| | CD Diffraction efficiency | 1.00 | — | — |
| Diffraction structure 2 | Diffraction structure type | Step type | | |
| | Number of steps (within a cycle) | 3 | | |
| | BD Diffraction efficiency | 0.67 | | |
| | DVD Diffraction efficiency | 0.65 | | |
| | CD Diffraction efficiency | 0.68 | | |

Example 6

In Example 6, the objective lens includes a central area, a peripheral area and a most peripheral area. The central area includes a first optical path difference providing structure, the peripheral area has a second optical path difference providing structure, and the most peripheral area is a refractive surface.

The first optical path difference providing structure is a structure wherein a first basic structure and a second basic structure are overlapped together. The first basic structure is a three-level step structure. The plus-first order diffracted light flux has the maximum diffracted-light amount among diffracted light fluxes generated when the first light flux enters the first basic structure, the minus-first order diffracted light flux has the maximum diffracted-light amount among diffracted light fluxes generated when the second light flux enters the first basic structure, and the minus-first order diffracted light flux has the maximum diffracted light amount among diffracted light fluxes generated when the third light flux enters the first basic structure. The second basic structure is made to be a blaze structure. The plus-second order diffracted light flux has the maximum diffracted-light amount among diffracted light fluxes generated when the first light flux enters the second basic structure, the plus-first order diffracted light flux has the maximum diffracted light amount among diffracted light fluxes generated when the second light flux enters the second basic structure, and the plus-first order diffracted light flux has the maximum diffracted-light amount among diffracted light fluxes generated when the third light flux enters the second basic structure.

The second optical path difference providing structure is a four-level step structure. The plus-second order diffracted light flux has the maximum diffracted-light amount among diffracted light fluxes generated when the first light flux enters the second optical path difference providing structure, and the zero-th order diffracted light flux has the maximum diffracted-light amount among diffracted light fluxes generated when the second light flux enters the second optical path difference providing structure.

Each of Table 15 and Table 16 shows lens data of Example 6.

TABLE 15

| | Specifications | | |
|---|---|---|---|
| | BD | DVD | CD |
| Focal length f (mm) | 2.200 | 2.424 | 2.458 |
| Wavelength $\lambda$ (nm) | 405 | 660 | 785 |
| NA | 0.85 | 0.6 | 0.48 |
| Effective aperture $\phi$ (mm) | 3.740 | 2.941 | 2.385 |
| Magnification | 0 | −0.0169 | −0.0166 |
| WD | 0.675 | 0.683 | 0.408 |
| Disc thickness (mm) | 0.0875 | 0.60 | 1.10 |

| | | | Arrangement | | | | | |
|---|---|---|---|---|---|---|---|---|
| | | | BD | | DVD | | CD | | |
| $i^{th}$ Surface | Distance from optical axis | ri | di (405 nm) | ni (405 nm) | di (660 nm) | ni (660 nm) | di (785 nm) | ni (785 nm) | Remarks |
| 0 | | | ∞ | | 145.00 | | 150.00 | | |
| 1 (Stop diameter $\phi$ mm) | | ∞ | 0.0 (3.74) | 1.0000 | 0.0 (2.95) | 1.0000 | 0.0 (2.34) | 1.0000 | Stop |
| 2-1 | $0.0 \leq h < 1.2$ | 1.5029 | 2.6800 | 1.5592 | 2.6800 | 1.5397 | 2.6800 | 1.5363 | Aspheric surface |
| 2-2 | $1.2 \leq h < 1.5$ | 1.4723 | −0.0047 | 1.5592 | −0.0047 | 1.5397 | −0.0047 | 1.5363 | Aspheric surface |
| 2-3 | $1.5 \leq h$ | 1.4489 | 0.0002 | 1.5592 | 0.0002 | 1.5397 | 0.0002 | 1.5363 | Aspheric surface |
| 3 | | −2.8225 | 0.6753 | 1.0000 | 0.6832 | 1.0000 | 0.4077 | 1.0000 | Aspheric surface |
| 4 | | ∞ | 0.0875 | 1.6195 | 0.6000 | 1.5772 | 1.1000 | 1.5706 | Disc |
| 5 | | ∞ | | | | | | | |

| | Aspheric surface coefficient | | | |
|---|---|---|---|---|
| | $(2\text{-}1)^{th}$ surface | $(2\text{-}2)^{th}$ surface | $(2\text{-}3)^{th}$ surface | $3^{rd}$ surface |
| κ | −6.6546E−01 | −8.0795E−01 | −7.7162E−01 | −4.5757E+01 |
| A4 | 7.0221E−03 | 1.1860E−02 | 1.4284E−02 | 9.3198E−02 |
| A6 | −4.3594E−03 | 8.1828E−04 | 1.3456E−03 | −9.9390E−02 |
| A8 | 4.1379E−03 | 1.6381E−03 | 1.7710E−03 | 7.7022E−02 |
| A10 | −1.8539E−03 | −1.2852E−03 | −1.1786E−03 | −4.0943E−02 |
| A12 | 2.9334E−04 | 4.1220E−04 | 2.9983E−04 | 1.2199E−02 |
| A14 | 2.1701E−04 | 2.3954E−04 | 2.0191E−04 | −1.5199E−03 |
| A16 | −1.6929E−04 | −1.6274E−04 | −1.6796E−04 | 0.0000E+00 |
| A18 | 4.5317E−05 | 2.5759E−05 | 4.7538E−05 | 0.0000E+00 |
| A20 | −4.4456E−06 | −1.4998E−07 | −4.8758E−06 | 0.0000E+00 |

*di − j (j ≠ 1) represents a displacement from (di − 1)$^{th}$ surface to (di − j)$^{th}$ surface.
*di − 1 represents a displacement from (di − 1)$^{th}$ surface to d(I + 1)$^{th}$ surface

TABLE 16

| Optical path difference function coefficient | | | |
|---|---|---|---|
| | | $(2\text{-}1)^{th}$ surface | $(2\text{-}2)^{th}$ surface |
| Diffraction structure 1 | λB (nm) | 405 | 405 |
| | Order number (BD/DVD/CD) | 2/1/1 | 2/0/— |
| | C1 | 0.0000E+00 | −5.8103E−03 |
| | C2 | −8.5572E−04 | −5.3899E−03 |
| | C3 | −9.7111E−04 | 4.5830E−03 |
| | C4 | 5.2360E−04 | −1.7216E−03 |
| | C5 | −1.3199E−04 | 2.3514E−04 |
| Diffraction structure 2 | λB (nm) | 405 | |
| | Order number (BD/DVD/CD) | 1/−1/−1 | |
| | C1 | −8.3626E−03 | |
| | C2 | 5.7973E−04 | |
| | C3 | −2.6477E−04 | |
| | C4 | 7.5227E−05 | |
| | C5 | −5.3020E−06 | |

| Form and efficiency of diffraction structure | | | |
|---|---|---|---|
| | | $(2\text{-}1)^{th}$ surface | $(2\text{-}2)^{th}$ surface |
| Diffraction structure 1 | Diffraction structure type | Blaze type | Step type |
| | Number of steps (within a cycle) | — | 4 |
| | BD Diffraction efficiency | 1.00 | 0.72 |
| | DVD Diffraction efficiency | 0.89 | 0.78 |
| | CD Diffraction efficiency | 1.00 | — |
| Diffraction structure 2 | Diffraction structure type | Step type | |
| | Number of steps (within a cycle) | 3 | |
| | BD Diffraction efficiency | 0.67 | |
| | DVD Diffraction efficiency | 0.65 | |
| | CD Diffraction efficiency | 0.68 | |

REFERENCE SIGNS LIST

| REFERENCE SIGNS LIST | |
|---|---|
| AC | Two-axis actuator |
| PPS | Dichroic prism |
| CL | Collimation lens |
| LD1 | Blue-violet semiconductor laser |
| LM | Laser module |
| OBJ | Objective lens |
| PL1 | Protective substrate |
| PL2 | Protective substrate |
| PL3 | Protective substrate |
| PU1 | Optical pickup apparatus |
| RL1 | Information recording surface |
| RL2 | Information recording surface |
| RL3 | Information recording surface |
| CN | Central area |
| MD | Peripheral area |
| OT | Most peripheral area |

The invention claimed is:

1. An objective lens for use in an optical pickup apparatus, for forming a converged spot on an information recording surface of a first optical disc including a protective layer with a thickness t1 by using a first light flux with a wavelength λ1 (μm) emitted from a first light source, and for forming a converged spot on an information recording surface of a third optical disc including a protective layer with a thickness t3 (t1<t3) by using a third light flux with a wavelength λ3 (1.7λ1<λ3<2.3λ1) emitted from a third light source, wherein an optical surface of the objective lens comprises a first basic structure being an optical path difference providing structure, the first basic structure comprises a step structure in which a plurality of ring-shaped step units are arranged concentrically about an optical axis as a center, and a step-difference amount d1 of a small step difference in each of the step units, in a direction of the optical axis satisfies the following conditional expression, where n is a refractive index of the objective lens for the first light flux:

$$0.5\lambda 1/(n-1) < d1 < \lambda 1/(n-1) \tag{1}.$$

2. The objective lens of claim 1, satisfying the following conditional expression:

$$0.5\lambda 1/(n-1) < d1 < 0.9\lambda 1/(n-1) \tag{1A}.$$

3. The objective lens of claim 1, satisfying the following conditional expression:

$$0.557\lambda 1/(n-1) < d1 < 0.89\lambda 1/(n-1) \tag{1B}.$$

4. The objective lens of claim 1, satisfying the following conditional expression:

$$0.55\lambda 1/(n-1) < d1 < 0.79\lambda 1/(n-1) \tag{1C}.$$

5. The objective lens of claim 1, for forming a converged spot on an information recording surface of a second optical disc including a protective layer with a thickness t2 (t1≦t2<t3) by using a second light flux with a wavelength λ2 (λ1<λ2<λ3) emitted from a second light source.

6. The objective lens of claim 5, wherein a first-order diffracted light flux has a maximum diffracted-light amount among diffracted light fluxes generated when the first light flux enters the first basic structure, a minus-second-order diffracted light flux has a maximum diffracted-light amount among diffracted light fluxes generated when the second light flux enters the first basic structure, and a minus-second-order diffracted light flux has a maximum diffracted-light amount among diffracted light fluxes generated when the third light flux enters the first basic structure.

7. The objective lens of claim 6, wherein the first basic structure comprises a five-level step structure, and satisfies the following conditional expression:

$$0.7\lambda 1/(n-1) < d1 < 0.9\lambda 1/(n-1) \tag{1D}.$$

8. The objective lens of claim 7, wherein the first basic structure comprises a five-level step structure, and satisfies the following conditional expression:

$$0.7\lambda 1/(n-1) < d1 < 0.75\lambda 1/(n-1) \tag{1E}.$$

9. The objective lens of claim 5, wherein a first-order diffracted light flux has a maximum diffracted-light amount among diffracted light fluxes generated when the first light flux enters the first basic structure, a minus-first-order diffracted light flux has a maximum diffracted-light amount among diffracted light fluxes generated when the second light flux enters the first basic structure, and a minus-first-order diffracted light flux has a maximum diffracted-light amount among diffracted light fluxes generated when the third light flux enters the first basic structure.

10. The objective lens of claim 9,
wherein the first basic structure comprises a three-level step structure, and satisfies the following conditional expression:

$$0.5\lambda 1/(n-1) < d1 < 0.8\lambda 1/(n-1) \tag{1F}$$

11. The objective lens of claim 1,
wherein a diffraction efficiency of a diffracted light flux with a maximum diffracted-light amount among diffracted light fluxes generated when the first light flux enters the first basic structure is 50% or more, and
a diffraction efficiency of a diffracted light flux with a maximum diffracted-light amount among diffracted light fluxes generated when the third light flux enters the first basic structure is 50% or more.

12. The objective lens of claim 5,
wherein a diffraction efficiency of a diffracted light flux with a maximum diffracted-light amount among diffracted light fluxes generated when the first light flux enters the first basic structure is 50% or more,
a diffraction efficiency of a diffracted light flux with a maximum diffracted-light amount among diffracted light fluxes generated when the second light flux enters the first basic structure is 50% or more, and
a diffraction efficiency of a diffracted light flux with a maximum diffracted-light amount among diffracted light fluxes generated when the third light flux enters the first basic structure is 50% or more.

13. The objective lens of claim 1,
wherein the optical surface of the objective lens comprises a first optical path difference providing structure in which the first basic structure and a second basic structure being an optical path difference providing structure are overlapped together.

14. The objective lens of claim 13,
wherein the first optical path difference providing structure comprises a step structure in which a plurality of ring-shaped step units are arranged concentrically about an optical axis as a center, and
a step-difference amount d0 of a small step difference in each of the step units, in the direction of the optical axis satisfies the following conditional expression, where n is a refractive index of the objective lens for the first light flux:

$$0.5\lambda 1/(n-1) < d0 < \lambda 1/(n-1) \tag{10}$$

15. The objective lens of claim 13,
wherein the second basic structure is a blaze structure,
a second-order diffracted light flux has a maximum diffracted-light amount among diffracted light fluxes generated when the first light flux enters the second basic structure,
a first-order diffracted light flux has a maximum diffracted-light amount among diffracted light fluxes generated when the second light flux enters the second basic structure, and
a first-order diffracted light flux has a maximum diffracted-light amount among diffracted light fluxes generated when the third light flux enters the second basic structure.

16. The objective lens of claim 13,
wherein the second basic structure is a five-level step structure,
a zero-th-order diffracted light flux has a maximum diffracted-light amount among diffracted light fluxes generated when the first light flux enters the second basic structure,
a first-order diffracted light flux has a maximum diffracted-light amount among diffracted light fluxes generated when the second light flux enters the second basic structure, and
a zero-th-order diffracted light flux has a maximum diffracted-light amount among diffracted light fluxes generated when the third light flux enters the second basic structure.

17. The objective lens of claim 13,
wherein the second basic structure is a four-level step structure,
a second-order diffracted light flux has a maximum diffracted-light amount among diffracted light fluxes generated when the first light flux enters the second basic structure,
a second-order diffracted light flux has a maximum diffracted-light amount among diffracted light fluxes generated when the second light flux enters the second basic structure, and
a first-order diffracted light flux has a maximum diffracted-light amount among diffracted light fluxes generated when the third light flux enters the second basic structure.

18. The objective lens of claim 13,
wherein when the second basic structure is a blaze structure, the step structure of the first basic structure and the blaze structure of the second basic structure are overlapped together such that positions of all of step-difference sections of the second basic structure agree with positions of step-difference sections of the first basic structure.

19. The objective lens of claim 13,
wherein when the second basic structure is a step structure, the step structure of the first basic structure and the step structure of the second basic structure are overlapped together such that positions of all large step differences of the second basic structure agree with positions of large step differences of the first basic structure, or such that positions of large step differences of the second basic structure agree with positions of all large step differences of the first basic structure.

20. The objective lens of claim 13,
wherein the step structure of the first basic structure and the blaze structure of the second basic structure are overlapped together such that repetition cycles of all the structures agree with each other.

21. The objective lens of claim 13,
wherein the optical surface of the objective lens comprises a first optical path difference providing structure in which the first basic structure and a second basic structure being an optical path difference providing structure are overlapped together, and
when the second basic structure is a blaze structure, the step structure of the first basic structure and the blaze structure of the second basic structure are overlapped together such that a position of at least one of step-difference sections of the second basic structure does not agree with positions of step-difference sections of the first basic structure.

22. The objective lens of claim 13,
wherein the optical surface of the objective lens comprises a first optical path difference providing structure in which the first basic structure and a second basic structure being an optical path difference providing structure are overlapped together, and
when the second basic structure is a step structure, the step structure of the first basic structure and the step structure of the second basic structure are overlapped together such that a position of at least one large step difference of the second basic structure does not agree with positions of large step differences of the first basic structure.
23. The objective lens of claim 13,
wherein the step structure of the first basic structure and the blaze structure or the step structure of the second basic structure are overlapped together such that repetition cycles do not agree with each other in at least a part of the structures.

24. An optical pickup apparatus comprising the objective lens of claim 1.

25. An optical disc drive apparatus comprising the optical pickup apparatus of claim 24.

* * * * *